US008861311B2

(12) United States Patent
Ledeczi et al.

(10) Patent No.: US 8,861,311 B2
(45) Date of Patent: Oct. 14, 2014

(54) SYSTEM AND METHOD FOR ESTIMATING PROJECTILE TRAJECTORY AND SOURCE LOCATION

(75) Inventors: Akos Ledeczi, Nashville, TN (US); Peter Volgyesi, Nashville, TN (US); Janos Sallai, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 732 days.

(21) Appl. No.: 13/092,252

(22) Filed: Apr. 22, 2011

(65) Prior Publication Data

US 2012/0314542 A1 Dec. 13, 2012

Related U.S. Application Data

(60) Provisional application No. 61/327,127, filed on Apr. 23, 2010.

(51) Int. Cl.
*G01S 3/80* (2006.01)

(52) U.S. Cl.
USPC .......................................... 367/127; 367/906

(58) Field of Classification Search
USPC ................................ 367/127, 906
See application file for complete search history.

(56) References Cited

U.S. PATENT DOCUMENTS

| 4,805,159 | A | * | 2/1989 | Negendank et al. | 367/127 |
|---|---|---|---|---|---|
| 5,072,518 | A | * | 12/1991 | Scott | 29/798 |
| 5,241,518 | A | * | 8/1993 | McNelis et al. | 367/127 |
| 5,930,202 | A | * | 7/1999 | Duckworth et al. | 367/127 |
| 6,178,141 | B1 | | 1/2001 | Duckworth et al. | |
| 7,433,266 | B2 | | 10/2008 | Ledeczi et al. | |
| 2007/0230269 | A1 | | 10/2007 | Ledeczi et al. | |
| 2008/0159078 | A1 | | 7/2008 | Barger et al. | |

OTHER PUBLICATIONS

International Search Report mailed on Dec. 28, 2011 in PCT Application No. PCT/US2011/033532 (filing date: Apr. 22, 2011). (6 pages).

* cited by examiner

*Primary Examiner* — Mark Hellner
(74) *Attorney, Agent, or Firm* — Novak Druce Connolly Bove + Quigg LLP; Eduardo J. Quinones

(57) ABSTRACT

Systems and methods for estimating projectile trajectory and projectile source location are provided. A method for estimating location information associated with a supersonic projectile propelled from a source includes recording sound at a first location using a single microphone during travel of the supersonic projectile to produce an acoustic recording. The method further includes estimating a miss distance between the first location and a trajectory of the projectile based on the shockwave length. Locating a projectile source includes concurrently recording sound at multiple locations and generating data sets associated with the locations, each of the plurality of data sets including a miss distance, a range, a time of arrival of a muzzle blast from the source, and a time of arrival of a shockwave produced by the projectile. Additionally, the method includes calculating an approximate location of the source at each of the locations based on the data sets.

48 Claims, 16 Drawing Sheets

SYSTEM AND METHOD FOR ESTIMATING PROJECTILE TRAJECTORY AND SOURCE LOCATION

CROSS REFERENCE TO RELATED APPLICATIONS

This application claims the benefit of Provisional Application Ser. No. 61/327,127, entitled SYSTEM AND METHOD FOR ESTIMATING PROJECTILE TRAJECTORY AND SOURCE LOCATION, filed Apr. 23, 2010, which is herein incorporated by reference herein.

FIELD OF TECHNOLOGY

The subject matter herein generally relates to estimation of projectile trajectory and position and in particular, to systems and estimate projectile trajectory and projectile source location.

BACKGROUND

The majority of existing counter-sniper systems rely on acoustics for detecting and localizing the position of a shooter. In general, these methods rely on the most common acoustic event associated with the discharge of a firearm, the muzzle. A muzzle blast is a loud, characteristic noise originating from the end of the muzzle, and propagating spherically away at the speed of sound. Because the muzzle blast is easily detectable, it is generally useful for localization purposes. The typical acoustic counter-sniper system uses an array of microphones to detect the Time of Arrival (TOA) of muzzle blasts at multiple microphones. There are a variety of methods then to estimate the shooter location based on Time Difference of Arrival (TDOA) and/or Angle of Arrival (AOA).

SUMMARY

The invention concerns systems and methods for estimating projectile trajectory and projectile source location. In a first embodiment of the invention, a method for estimating location information associated with a supersonic projectile propelled from a source is provided, the method includes recording sound at a first location using a single microphone during travel of the supersonic projectile to produce an acoustic recording. The method further includes estimating a miss distance (b) between the first location and a trajectory of the supersonic projectile based on the shockwave length.

In a second embodiment of the invention, a method for locating a source of a projectile is provided. The method includes concurrently recording sound at three or more locations during travel of the supersonic projectile to produce acoustic recordings at each of the locations. The method also includes generating a plurality of data sets associated with the locations, each of the plurality of data sets including a miss distance, a range, a time of arrival of a muzzle blast from the source, and a time of arrival of a shockwave produced by the projectile. Additionally, the method includes sharing the plurality of data sets among the plurality of locations and independently calculating an approximate location of the source at each of the locations.

In a third embodiment of the invention, a system for determining location information associated with a supersonic projectile is provided. The system includes at least one sensor device including a transducer system configured for sampling sound at a first location during travel of the supersonic projectile to produce a single channel acoustic recording of the sound. The sensor device also includes a storage element for storing the acoustic recording and a processing element configured for calculating a time difference of arrival (TDOA) between a muzzle blast at the source and a shockwave generated by the supersonic projectile based on the acoustic recording, estimating a miss distance (b) between the first location and estimating a range between the first location and the source based on the miss distance and the TDOA.

In a fourth embodiment of the invention, a method for estimating location information associated with a supersonic projectile propelled from a source is provided. The method includes recording sound at a first location using a single microphone during travel of the supersonic projectile to produce an acoustic recording. The method also includes calculating a time difference of arrival (TDOA) between a muzzle blast at the source and a shockwave generated by the supersonic projectile based on the acoustic recording. Further, the method includes estimating a miss distance (b) between the first location and a trajectory of the supersonic projectile based on the shockwave length and estimating a range between the first location and the source based on the miss distance and the TDOA.

In a fifth embodiment of the invention a method for locating a source of a projectile is provided. The method includes obtaining a shockwave lengths, shockwave times of arrival (TOAs), and muzzle blast TOAs for a plurality of sensor locations. The method further includes estimating a trajectory for the projectile based at least the plurality of sensor locations, the shockwave lengths, and the shockwave TOAs. Additionally, the method includes determining a final source location for the source based on the trajectory and the plurality of sensor locations.

In a sixth embodiment of the invention, a system for locating a source of a projectile is provided. The system includes a processor and a first module to configure the processor to obtain a shockwave lengths, shockwave times of arrival (TOAs), and muzzle blast TOAs for a plurality of sensor locations. The system also includes a second module to configure the processor to estimate a trajectory for the projectile based at least the plurality of sensor locations, the shockwave lengths, and the shockwave TOAs. The system further includes a third module to configure the processor to determine a final source location for the source based on the trajectory and the plurality of sensor locations.

BRIEF DESCRIPTION OF THE DRAWINGS

Embodiments of the present application will now be described, by way of example only, with reference to the attached Figures, wherein.

DETAILED DESCRIPTION

Figure 1:
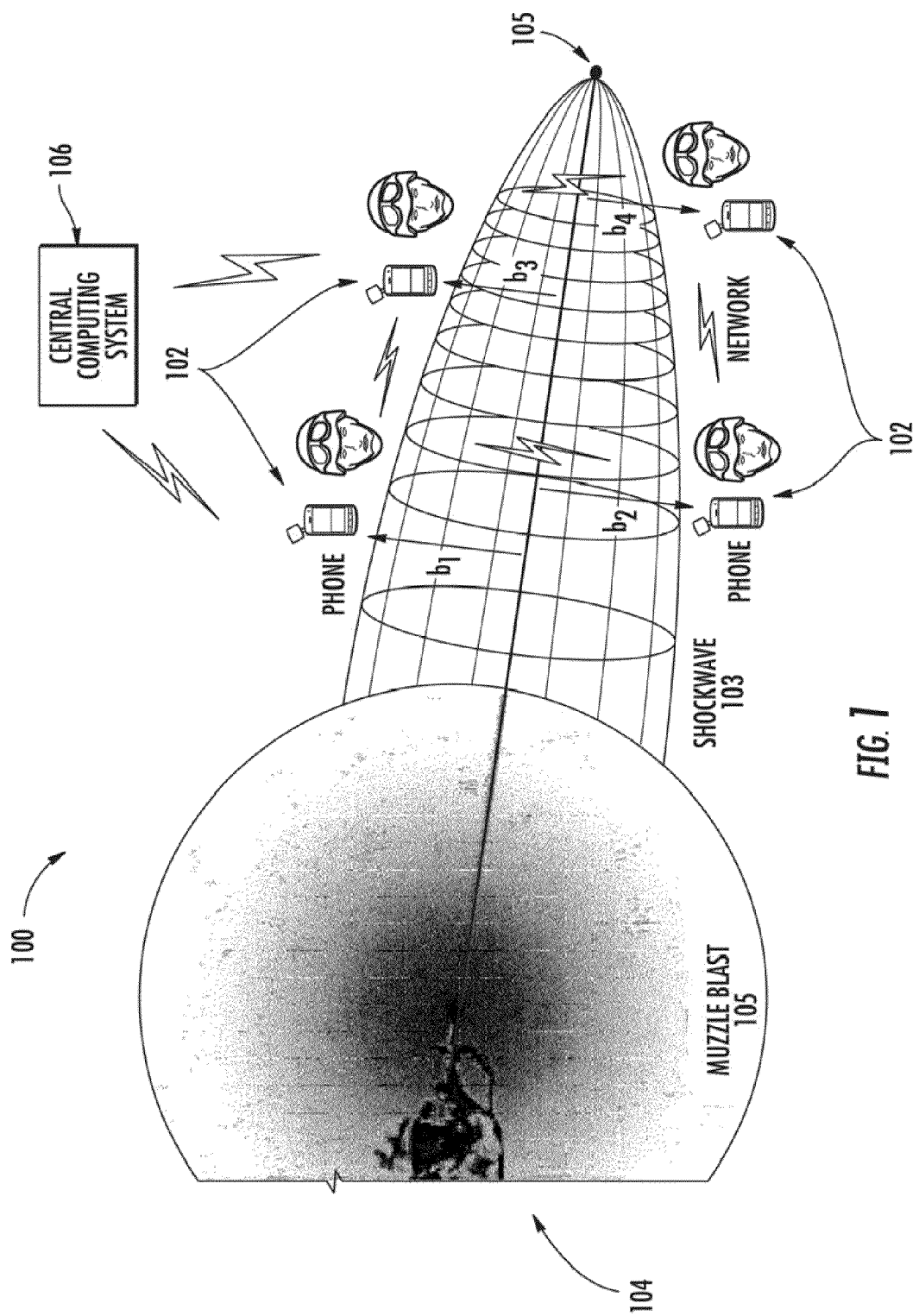
FIG. 1 is a schematic diagram illustrating an exemplary system 100 for determining location information for a projectile in accordance with the various embodiments of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, the firing of any conventional firearm typically generates an acoustic event, specifically the muzzle blast propagating spherically away from the end of the muzzle at the speed of sound. In addition to the muzzle blast, discharging of conventional rifles typically results in a second acoustic event, a shockwave. In conventional rifles, projectiles at supersonic velocities to increase both the range and accuracy. These supersonic velocities result in acoustic shocks being generated along the trajectory of the projectile. The shockwave is the result of the air being greatly compressed at the tip, and expanded at the end of the projectile, as it slices through the air.

Under ideal circumstances the pressure signal corresponding to this shockwave has a characteristic and distinctive waveform, called an N-wave. In general, the length of the N-wave is a few hundred microseconds. The length can depend on a number of factors, but the two most significant parameters are the caliber of the projectile and the miss distance, i.e., the distance between the microphone and the trajectory of the projectile. Theoretically, a shockwave front is shaped like a cone (the Mach cone) moving along the trajectory of the projectile and the angle of the cone depends on the speed of the bullet. Typically, this angle is continuously increasing as the bullet decelerates producing a distorted conical shape.

In counter-sniper systems relying on N-waves and muzzle blasts, an array of microphones can be used to detect the Time of Arrival (TOA) of the two events at multiple microphones. The TOA at the different microphones can then be used estimate the shooter location based on Time Difference of Arrival (TDOA) and/or Angle of Arrival (AOA). However, these systems typically rely on multiple microphones or microphone arrays at multiple locations and that are wired to a central computer. At this central computer, the acoustic signals detected at each microphone are combined to determine shooter location, projectile trajectory, and miss distances. However, such methods typically require more than one microphone (generally three or more) to successfully generate usable location information. Thus, such systems are generally complex and are of little value in dynamically changing scenarios, as in a battlefield. Further, traditional TDOA-based methods are generally sensitive to erroneous detections of echoes in non line-of-sight (LOS) conditions that are prevalent in most urban environments.

To overcome the various limitations of conventional acoustic counter-sniper and similar location systems for supersonic projectiles, the various embodiments of the invention provide systems and methods for providing location information. In particular, the various embodiments of the invention provide for determining at least a portion of location information, such as miss distance and range (i.e., a distance to the source) of a projectile from acoustic information obtained at a single location using a single microphone (i.e., a single channel acoustic recording). In particular, based on 1) shockwave length and the 2) TDOA between the shockwave and the muzzle blast, at least a miss distance and a range, relative to the single location, can be obtained without requiring additional information from other locations. Further, by combining and sharing information from multiple locations, a consistency function-based sensor fusion technique can be used to determine or estimate the trajectory and the location of the source of the projectile. Such an approach requires significantly less centralization of resources and provides a method for generating shooter location information.

System Concept

As described above, the various embodiments of the invention provide for recording acoustic information at one or more locations and using this information to provide miss distance, trajectory information, and (when combining information from multiple locations) location information for the source of a projectile. An exemplary system is illustrated below in FIG. 1. Although the various embodiments of the invention will generally be described with respect to using mobile communications devices as recording and computing devices, the invention is not limited in this regard. Rather, the various embodiments of the invention can be used with various types of recording and/or computing devices.

FIG. 1 is a schematic diagram illustrating an exemplary system 100 for determining location information for a projectile in accordance with the various embodiments of the invention. As shown in FIG. 1, the system 100 can include one or more sensor devices 102 for generating an acoustic recording when a source 104 (e.g., a rifle or other firearm) of a projectile 105 is in operation. As described above, the sensor devices 102 can be communications devices in communication with each other. In some cases, the sensor devices can be communicatively coupled to a central computing system 106.

In the various embodiments of the invention, each sensor device 102 can be configured to continually sample/record acoustic events using a microphone. Based on the recording, the sensor device 102 can also be configured to use a detection algorithm to classify each detected acoustic event as shockwave 103, a muzzle blast 105, or as other types of acoustic events. The sensor device 102 can also be further configured to extract features of the acoustic events, such as shockwave length or period. Time information can be provided for the sensor device 102 using an internal clock and/or externally provided information. For example, in some embodiments of the invention, sensor device 102 can be a mobile phone device that obtains time information using a network source. Further, sensor device 102 can also obtain location information. For example, in the case of a mobile phone device, global positioning system (GPS) elements can be used to determine a location and a local time for the sensor device 102.

In the case of multiple communications devices, the detection of acoustic events can be shared via a communications network. For example, the communications devices can be configured to use a wireless communication network (e.g., 2G, 3G, 4G, WiFi, or any other type of wireless connectivity). In some embodiments of the invention, each sensor device 102 can be configured to collect data locally, share data with other sensor devices, and generate location information based on the local data and any data received from other sensor devices. The location information can then be provided to user through audio and/or visual feedback.

Signal Acquisition

As described above, sensor devices 102 include a transducer system for detecting acoustic events through audio sampling/recording. For example, the transducer system can include the microphone and supporting circuitry of a mobile phone or other communications device for converting audio signals to electronic signals and for storing a recording of these signals. In the case of a mobile phone, such devices typically have a ~8 kHz sampling rate. However, to reliably detect acoustic events such as muzzle blasts and shockwaves associated with a projectile; a significantly higher sampling rate is generally needed. Thus, in embodiments of the invention using mobile phones as sensor devices 102, the sensor devices 102 are configured to operate at higher sampling rates. For example, in one embodiment of the invention, a conventional mobile phone was modified to operate in a detection mode in which the sampling rate was increased to ~48 kHz to provide adequate sampling.

Additionally, a sensor device 102 in the various embodiments of the invention generally has to contend with the relatively high energy of shockwaves. In general, many types of microphones are relatively sensitive and go to saturation even when the source of a noise is relatively far away (with respect to the user). Further, an acoustic channel becomes practically unusable for several milliseconds after the rising edge of a shockwave, making shockwave length estimation and muzzle blast detection difficult to determine. This is illustrated in FIG. 2.

Figure 2:
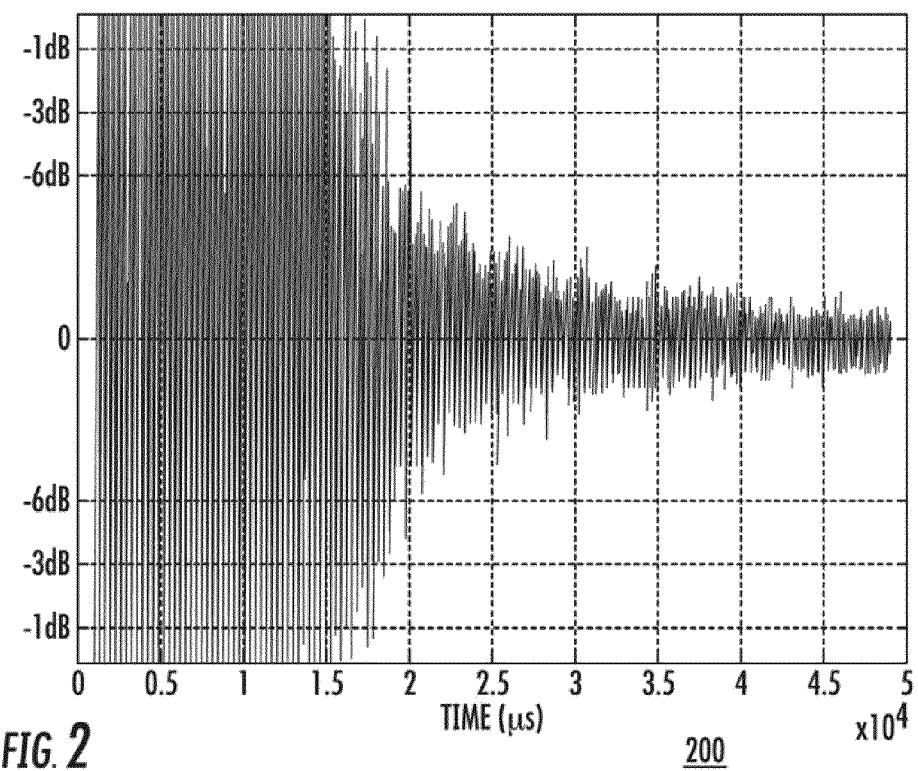
FIG. 2 is a plot 200 of audio intensity versus time for an HTC hero phone during audio sampling at 48 kHz during discharge of an AK-47 assault rifle at a distance of 40 m and at a miss distance of 1 m.

FIG. 2 is a plot 200 of audio intensity versus time for an HTC hero phone during audio sampling at 48 kHz during discharge of an AK-47 assault rifle at a distance of 40 m and at a miss distance of 1 m. As shown in FIG. 2, the effects of saturation and the rising edge of the shockwave result in an acoustic signal in which the portions associated with muzzle blast and the shockwave are difficult to discern. Therefore, in the various embodiments of the invention, the sensor devices 102 can be configured to include mechanical damping to reduce such effects. This is illustrated in FIG. 3.

Figure 3:
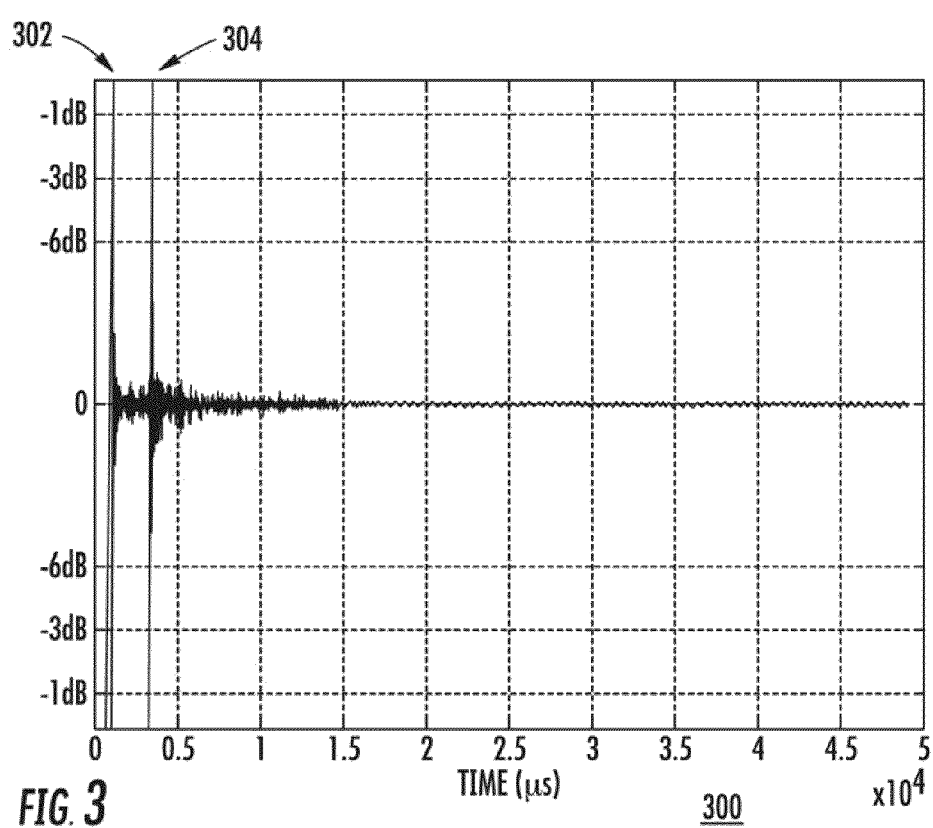
FIG. 3 is a plot 300 of audio intensity versus time for an HTC hero phone during audio sampling at 48 kHz during discharge of an AK-47 assault rifle at a distance of 40 m and at a miss distance of 1 m with mechanical damping.

FIG. 3 is a plot 300 of audio intensity versus time for an HTC hero phone during audio sampling at 48 kHz during discharge of an AK-47 assault rifle at a distance of 40 m and at a miss distance of 1 m with mechanical damping. In particular, the microphone of the HTC hero phone is covered with electrical tape. As shown in FIG. 3, the portions of the acoustic signal associated with the shockwave (portion 302) and the muzzle blast (304) are clearly discernable. Therefore, the shockwave length and the TDOA between the two events can be accurately measured.

The various embodiments of the invention can be used with any type of mechanical damping system. For example, in some embodiments of the invention, the microphone can be fitted with a resilient cap for covering a microphone or opening thereof. In another example, films, other than electrical tape, can be used. However, the various embodiments of the invention are not limited in this regard.

As described above, the sensor device 102 is configured to detect and identify portions of an acoustic signal associated with the shockwave and muzzle blast. In the various embodiments of the invention, the shockwave can be identified by steep rising edges at the beginning and end of the signal with an interval constraint on the elapsed time between these edges. Muzzle blast events are characterized by a long initial period where the first half period is significantly shorter than the second half. Thus, the sensor device 102 can be configured to include an algorithm for identifying such features in acoustic signals. In general, streaming data processing (event detection) is possible with large hardware/software buffers; however there can still be significant jitter in the scheduling of the detection algorithm. Therefore, in some embodiments of the invention, the sample counter can be used as a time reference in any identification algorithms to determine TOA or any other extracted feature data needing accurate time stamping.

Miss Distance Estimation

As described above, sensor devices 102 can be configured to generate some location information regarding a fired projectile locally. In particular a miss distance ($b_1 \ldots b_4$), which defines how far the projectile 105 passed by the sensor device 102. In general, this miss distance (b) is dependent on the shockwave period or length (T), the projectile diameter (d) and length (l), the Mach number (M), and the speed of sound (c), where the Mach number is the ratio of the velocity of the projectile to the speed of sound, typically $>>1$. This relationship is shown below in equation (1):

$$T = \frac{1.82 M b^{1/4}}{c(M^2-1)^{3/8}} \frac{d}{l^{1/4}} \approx \frac{1.82 d}{c}\left(\frac{Mb}{l}\right)^{1/4} \tag{1}$$

Thus the miss distance (b) can be expressed as:

$$b = \left(\frac{Tc}{1.82d}\right)^4 \frac{l}{M^4}(M^2-1)^{3/2} \approx \left(\frac{Tc}{1.82d}\right)^4 \left(\frac{l}{M}\right) \tag{2}$$

Figure 4A:
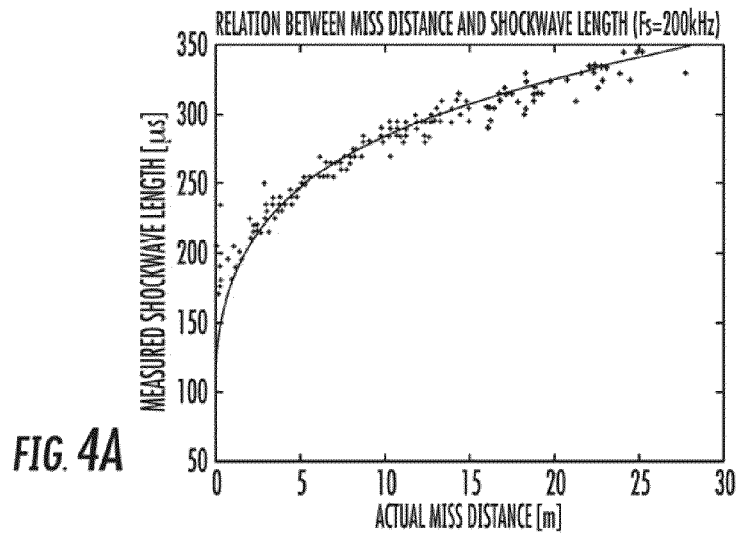
FIGS. 4A, 4B, and 4C are x-y plots of shockwave length versus actual miss distance for sampling rates of 200 kHz, 100 kHz, and 48 kHz, respectively, of 196 shots with three different caliber projectiles, as recorded by 10 sensors (4 microphones by sensor)
Figure 4B:
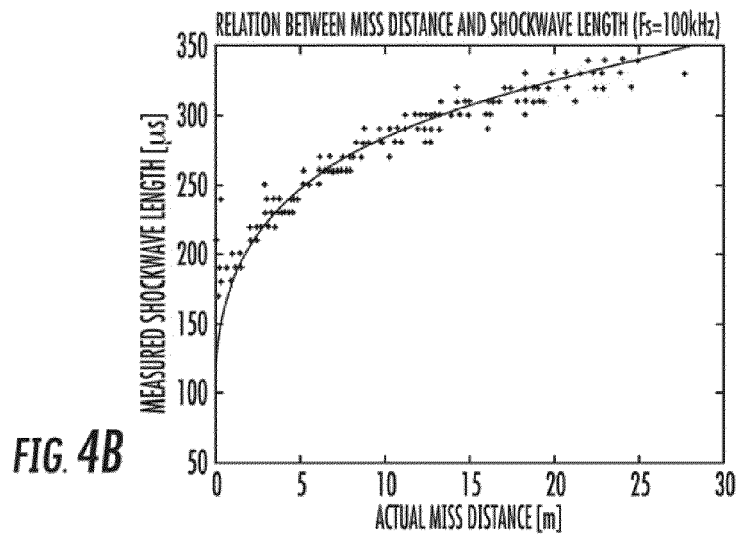
Figure 4C:
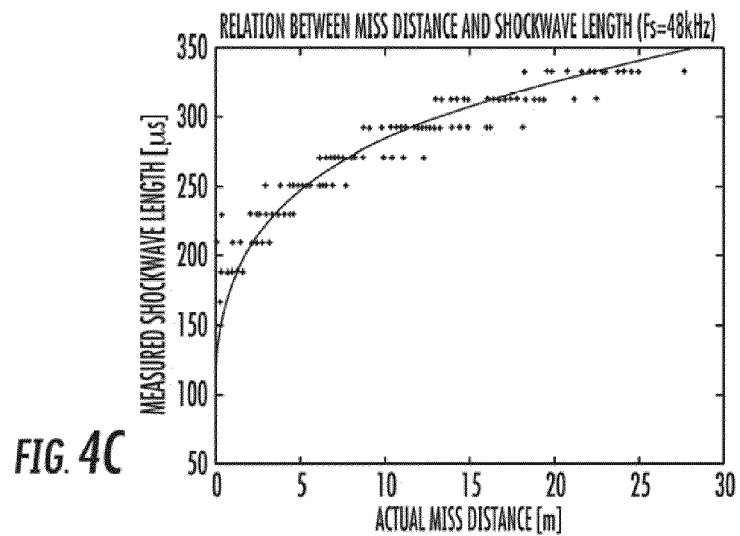

However, in many cases, the type of projectile will be known or is limited to only a few types. Therefore, it is not generally necessary to compute b directly. Rather, the value of b can be retrieved using a lookup method, thus reducing the computational burden on sensor device. This is conceptually illustrated with respect to FIGS. 4A, 4B, and 4C. FIGS. 4A, 4B, and 4C are x-y plots of shockwave length versus actual miss distance for sampling rates of 200 kHz, 100 kHz, and 48 kHz, respectively, of 196 shots with three different caliber projectiles, as recorded by 10 sensors (4 microphones by sensor). The data contains a mixture of AK-47 and M240 shots that have different muzzle speed, hence Mach numbers, and use different ammunition (7.62×39 mm vs. 7.62×51 mm). FIGS. 4A-4C show that the shockwave length for a given caliber can be approximated with a power function of the miss distance. For the data in FIGS. 4A-4C, a best fit function for the 7.62 mm data is: $T=178.11b^{0.1996}$. Although this fit includes data from various ammunition types, such a variability or worse is typically expected in a battlefield scenario. Such a function can also be used to generate miss distance data for a specific ammunition type a priori, which can be later accessed without the need compute the miss distance directly. Relying on such data or simplifications of equations (1) and (2) may not provide accurate miss distances, but the error introduced by such an approximation is relatively small and trivial in many cases, such as a battlefield scenario. This is illustrated with respect to FIGS. 5A, 5B, and 5C.

Figures 5A, 5B, 5C:
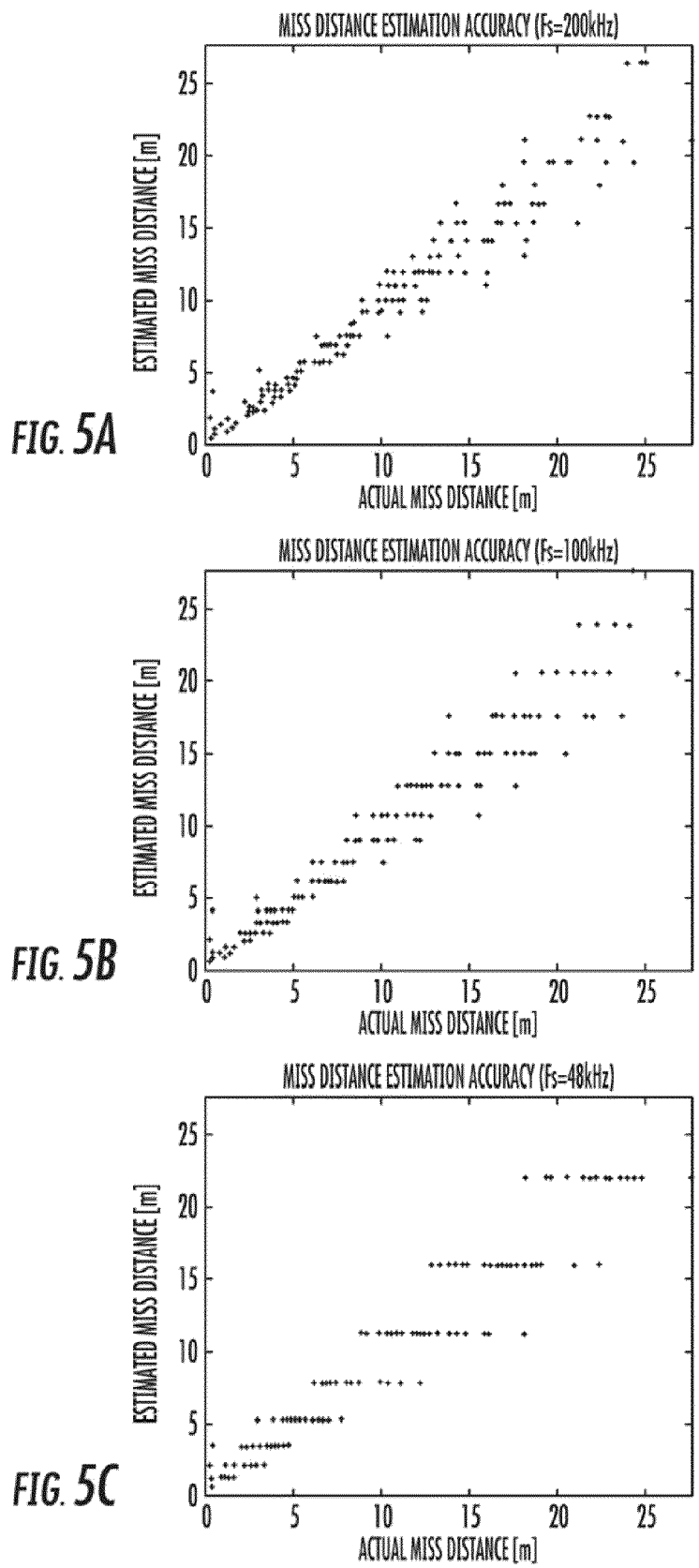
FIGS. 5A, 5B, and 5C are x-y plots of actual miss distance versus estimated miss distance for sampling rates of 200 kHz, 100 kHz, and 48 kHz, respectively, all 166 shockwave detections in FIGS. 4A, 4B, and 4C of AK-47 shots fired from a distance of no more than 150 m from the sensors, and manually degraded to reflect the effects of using a 48 kHz sampling rate.

FIGS. 5A, 5B, and 5C are x-y plots of actual miss distance versus estimated miss distance for sampling rates of 200 kHz, 100 kHz, and 48 kHz, respectively, all 166 shockwave detections in FIGS. 4A, 4B, and 4C of AK-47 shots fired from a distance of no more than 150 m from the sensors, and manually degraded to reflect the effects of using a 48 kHz sampling rate. Thereafter, the miss distance was estimated using equations (1) and (2) and the degraded shockwave values. The actual miss distances ranged from 0 to 27.5 m. However, the average absolute error of miss distance estimation was 1.3 m, the maximum error being 6.7 m.

With the ability to compute a miss distance, it is therefore possible to estimate the trajectory of the projectile and estimate the range to the shooter based on acoustic signals obtained at a single location. As a result, even though the user may be unable to directly estimate the location of a shooter, the trajectory and range information can permit the user to identify possible locations for the shooter. Further, no additional information from any other sensor devices would be needed. This is described below with respect to FIG. 6.

Figure 6:
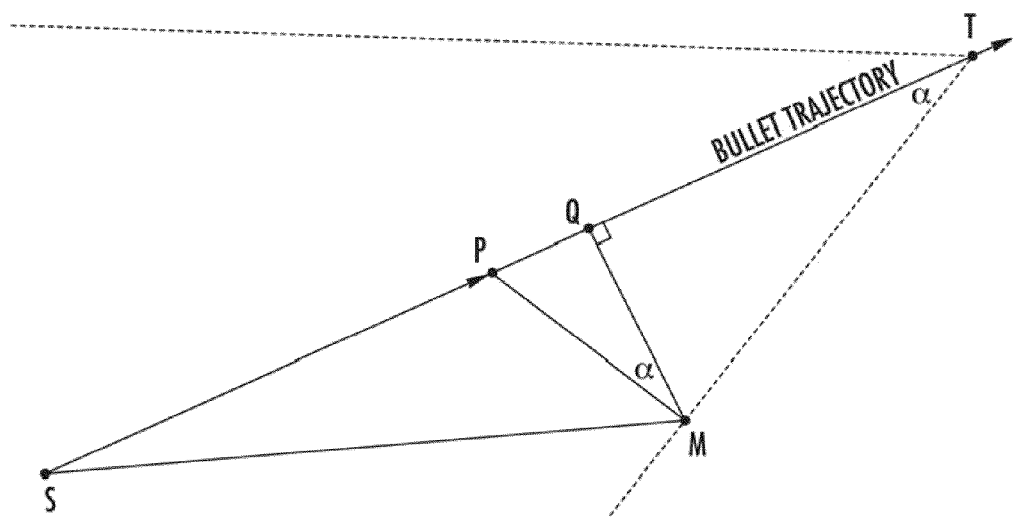
FIG. 6 is a schematic showing calculation of range and trajectory based on muzzle blast and shockwave.

FIG. 6 is a schematic showing calculation of range and trajectory based on muzzle blast and shockwave. In FIG. 6, points S and M represent the location of the shooter and that of the sensor device, respectively. The range, i.e. the Euclidean distance between points S and M, as $d_{M,S}$. Assuming LOS (line-of-sight) condition, the detection time of the muzzle blast ($t_{mb}$) can be written as $$t_{mb} = t_{shot} + \frac{d_{M,S}}{c} \tag{3}$$

where $t_{shot}$ is the time of discharge of the firearm, and c is the speed of sound.

Since the shockwave does not originate from the muzzle but from the projectile traveling along its trajectory, the time traveled by the bullet from the muzzle to a point P on the trajectory and the time traveled by the wave front of the shock wave from point P to the M need to be considered. Assuming that the projectile travels as a constant velocity v, the shockwave detection time ($t_{sw}$) can then be written as:

$$t_{sw} = t_{shot} + \frac{d_{S,P}}{v} + \frac{d_{P,M}}{c} \tag{4}$$

Where $d_{S,P}$ is the distance from the shooter (point S) to point P and $d_{P,M}$ is the distance from point P to the sensor device (point M). Combining equations (3) and (4), the measured shockwave-muzzle blast TDOA can then be expressed as $$t_{mb} - t_{sw} = \frac{d_{M,S}}{c} - \frac{d_{S,P}}{v} - \frac{d_{P,M}}{c} \tag{5}$$

Now, since it is assumed that the projectile has a constant velocity, the shockwave front will have a distorted conical shape, as described above, such that the angle ($\alpha$) between the trajectory and the conical surface is $$\alpha = \sin^{-1}\frac{c}{v} \tag{6}$$

Typically, angle PMT will be a right angle. Therefore, angle PMQ=$\alpha$ because the respective triangles are similar. Thus, knowing $\alpha$ and the calculated miss distance ($b=d_{Q,M}$) using tabulated values or equations (1), (2), derivatives therefrom, the distances $d_{S,P}$ and $d_{P,M}$ can be expressed as follows:

$$d_{P,M} = \frac{d_{Q,M}}{\cos(\alpha)} \tag{7}$$

and $$d_{S,P} = d_{S,Q} - d_{P,Q} \tag{8}$$

where, $$d_{S,Q} = \sqrt{(d_{S,M}^2 - d_{Q,M}^2)} \quad (9)$$

using the Pythagorean theorem, and $$d_{P,Q} = d_{Q,M} \tan(\alpha) \quad (10)$$

Therefore, Equation (3) can be solved for the range $d_{M,S}$ or $d_{S,M}$, resulting in a closed form formula that can be evaluated without requiring significant computational power:

$$d_{S,M} = \frac{1}{2(c^4 - v^4)}(P - 2\sqrt{Q})$$

where P and Q are defined as $$P = -2v^3 d_{Q,M} \sqrt{v^2 + c^2} - 2(t_{mb} - t_{sw})c^3 v^2 + \quad (11)$$
$$2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 -$$
$$2c^7 d_{Q,M}(t_{mb} - t_{sw})v \sqrt{v^2 + c^2} + c^8(t_{mb} - t_{sw})^2 v^2 +$$
$$2c^8 d_{Q,M}^2 + 2v^5 d_{Q,M} \sqrt{v^2 + c^2}(t_{mb} - t_{sw})c^3$$

While relaxing the assumption of constant bullet speed, and incorporating a weapon-specific deceleration constant in the equations would result in more precise results, finding the solution for $d_{M,S}$ would require numerical methods, making the method more computationally expensive than evaluation of equation (11).

There are two main sources of error here. The first one is the inaccuracy of the miss distance estimate, as described above. The second is using a fixed projectile velocity. However, this can be greatly improved by using a linear deceleration function and a simple iterative approach can be used to obtain a more accurate estimate of range. For example, the range can be initially estimated using a fixed projectile speed. Once the range estimate is computed, the speed of the projectile corresponding to that range is used to compute a new range estimate. This can be repeated a few more times until the range estimate converges. The results of such an iterative approach are shown in FIG. 7.

Figure 7:
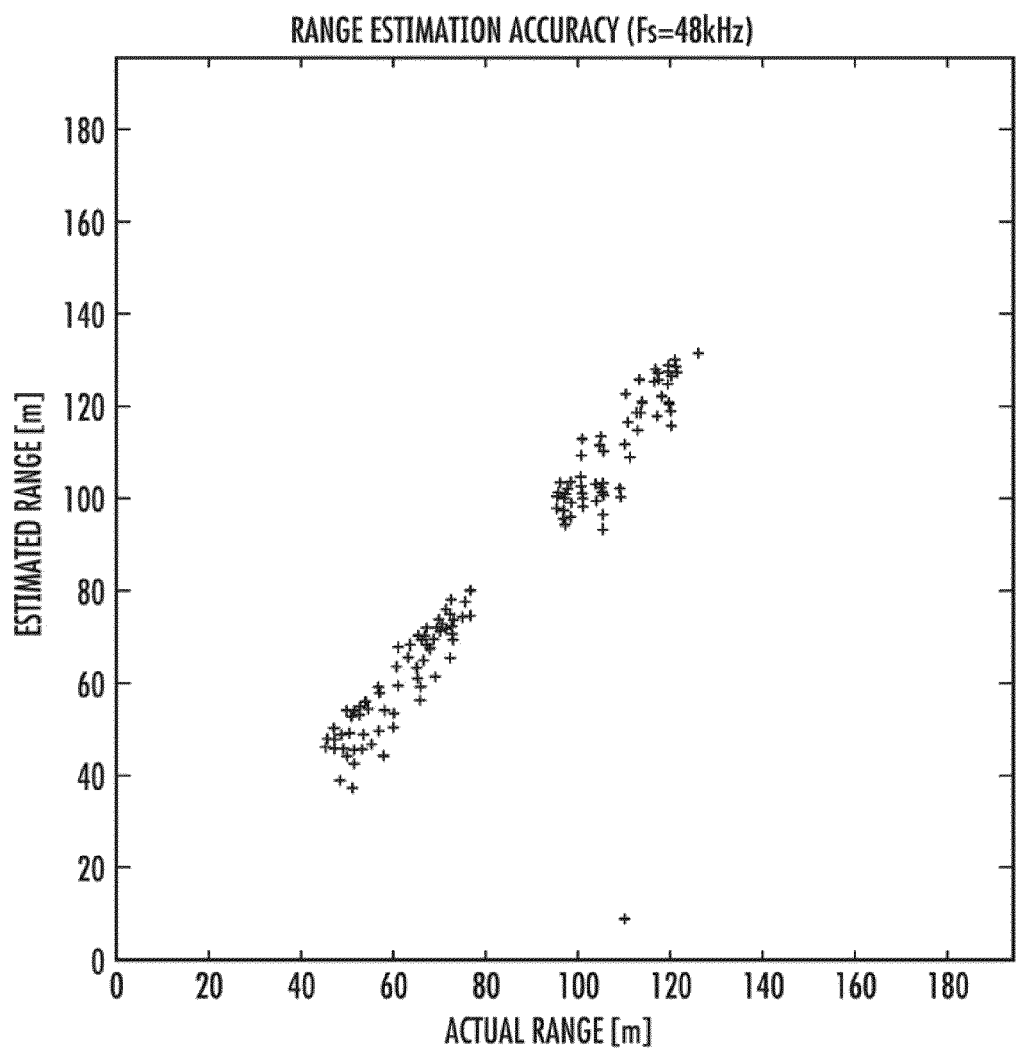
FIG. 7 is an x-y plots of actual range versus estimated range for sampling rates of 200 kHz, 100 kHz, and 48 kHz for all 166 shockwave detections in FIGS. 4A, 4B, and 4C of AK-47 shots fired from a distance of no more than 150 m from the sensors, and manually degraded to reflect the effects of using a 48 kHz sampling rate.

FIG. 7 is an x-y plot of actual range versus estimated range for sampling rates of 200 kHz, 100 kHz, and 48 kHz for all 166 shockwave detections in FIGS. 4A, 4B, and 4C of AK-47 shots fired from a distance of no more than 150 m from the sensors, and manually degraded to reflect the effects of using a 48 kHz sampling rate. First, the miss distances were computed as described above. Thereafter, equation (3) was solved to obtain a range, assuming a projectile speed of 650~m/s and sound propagation speed of 340 m/s. When the resulting ranges were 50 m to 100 m, 100 m to 150 m, and 150 m to 200 m, respectively, the range values were iteratively recalculated with a decreased projectile speed assuming a 312 m/s$^2$ deceleration. In FIG. 7, the average absolute range estimation error was 5.54 m. Apart from two outliers that that are results of false detections, the maximum error was 15 m.

It is worth noting that non-Line of Sight (LOS) conditions can cause problems. The typical scenario is that the shockwave is LOS as the bullet passes close to the sensor, but the shooter itself can be blocked if the shooter is taking cover, for example. In this case, the muzzle blast detection may belong to an echo. (Under LOS conditions, echoes do not generally matter since the true muzzle blast will always reach the microphone first since it travels the shortest possible path.) Therefore, in some embodiments of the invention, the sensor device can be configured to include a geometric filter. In particular, a means for detecting echoes based on the observation that TDOA between the shockwave and the muzzle blast is too long to be possible. Thus, when the sensor device detects such a condition, it can inform the used that only the miss distance can be computed and no range information can be provided.

Additionally, telling the user that the shooter is non-LOS can be valuable information. Further, the sensor devices can be configured to not transmit such false muzzle blast detections to the network easing the sensor fusion calculations described below.

Networked Operation

Although single sensor devices in accordance with the various embodiments of the invention can be configured to provide users with miss distance and range information, an accurate estimate of the shooter position is generally not possible without data from additional sensor devices. Thus, as described above with respect to FIG. 1, a system consisting of multiple sensor devices 102 to form a distributed sensing network.

In operation, the observations from the sensor devices 102 will be broadcasted to all sensor devices in the vicinity. Thus, the sensor devices 102 can be configured to fuse all observations obtained to provide a shooter location estimate. Thus, by providing a networked system of at sensor device, it is possible to compute a shooter location and a projectile trajectory estimate as opposed to only range and miss distance estimates provided by a single sensor device.

In conventional systems, single-channel UGS-like nodes are used to provide very accurate shooter locations. However, such systems require a significantly higher number of nodes. For example, a typical conventional system would utilize 50-60 sensors for a 100×50 m area. Additionally, such systems generally require accurate position information. Further, such nodes typically include multiple microphones. In contrast, a system in accordance with the various embodiments of the invention can provide accurate shooter location with only three sensor devices, without requiring precise location information and using a single microphone at each location. This fusion technique is illustrated below with respect to FIG. 8.

Figure 8A:
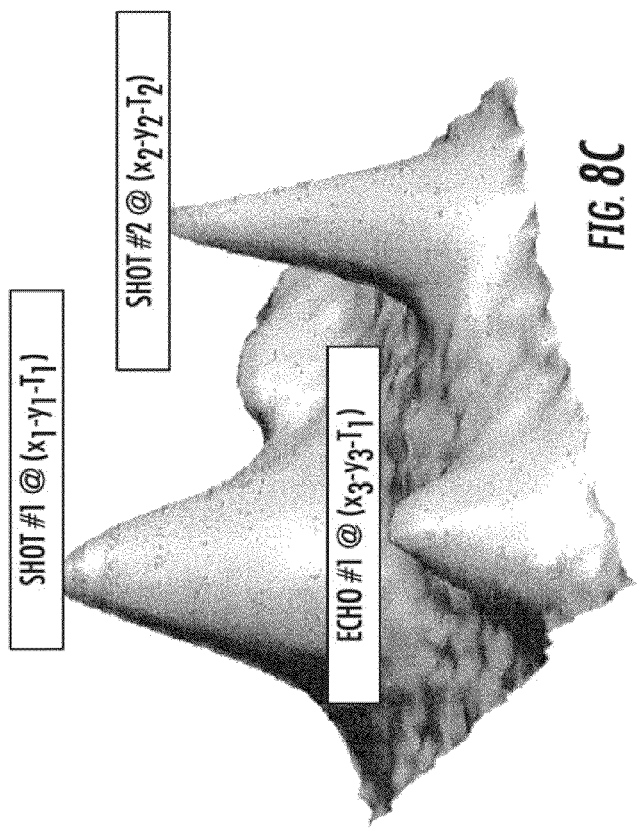
FIG. 8 is a simplified sensor fusion illustration for a point source.
Figure 8B:
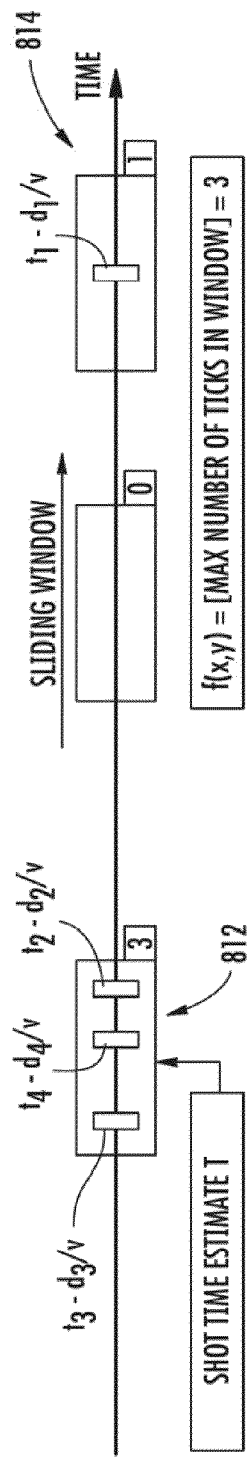
Figure 8C:
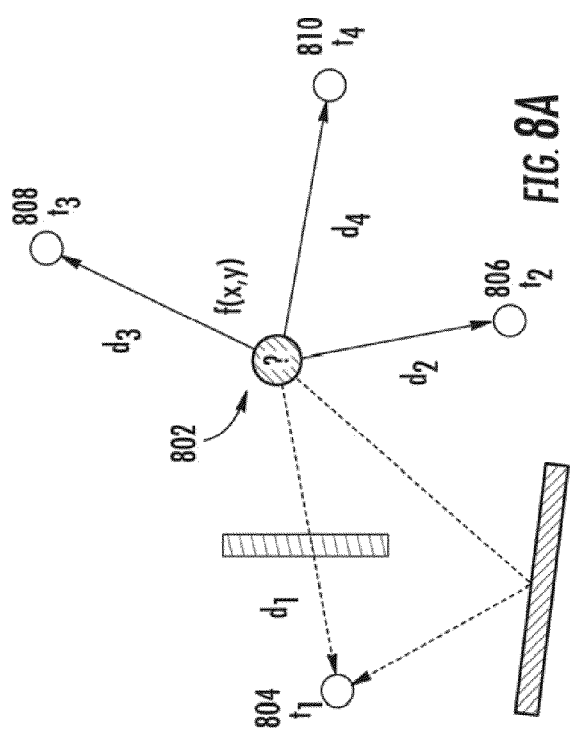

FIG. 8 is a simplified sensor fusion illustration for a point source. With respect to FIG. 8, consider a simple point source 802, for example, a muzzle blast. Part a) of FIG. 8 shows four circles 804, 806, 808, and 810 representing four sensors that detected this event and the corresponding TOA ($t_1$, $t_2$, $t_3$, $t_4$). Since the sensor positions and the speed of sound are known, when the shot was fired can be computed according to the sensor readings (part b) of FIG. 8). Thus, if the position is the correct shooter position, then all LOS sensors will agree on the time of the shot. That is, these detections will fall within a narrow window 812 whose width is determined by the possible detection errors that are dominated by the sensor position errors. So, if the sensor positions are known to one foot of accuracy, then all LOS detections will fall within a millisecond wide window on the timeline at the correct shooter position. Non-LOS detections, on the other hand, will show up as outliers 814. For example, consider the first sensor 804 in FIG. 8 whose detection time was $t_1$. The sound of the shot traveled longer then is used in the computation; hence, it will result in an erroneous estimated shot time.

Afterwards, a consistency function is defined for every point in the three dimensional area of interest as the maximum number of sensor detections that fall within a narrow time window. The estimated shot position will then be the global maximum of this function. This is shown in portion c) of FIG. 8. A multi-resolution search procedure based on interval arithmetic zooms in on the global maximum rapidly. Note that multiple shots will show up as multiple peaks. Also note that a consistent echo, that is, an echo from the same obstruction measured by multiple sensors, shows up as a local maximum also. However, it can be shown that the estimated absolute time of a real shot and a corresponding consistent echo are the same. As long as more sensors detect the real shot than the echo, peaks due to echoes can be easily eliminated.

In the various embodiments of the invention, each sensor device that detects a shot measures the shockwave length, the TOA of the shockwave and the muzzle blast, the miss distance, and the range, as described above. This locally computed information is then shared with all other sensor devices in the vicinity. The sensor fusion algorithm uses then 1) miss distance estimates, 2) range estimates, 3) shockwave TOAs and 4) muzzle blast TOAs. In some cases, some sensor devices may not be able to provide all four of these values. For example, if the acoustic recording does not allow muzzle blast detection, only the miss distance and shockwave TOA can be shared. Since each individual range estimate is derived from the miss distance estimate and the TDOA of the shockwave and the muzzle blast on the phone, it could be considered redundant information. However, including it in the sensor fusion directly makes the computations simpler and less resource intensive.

Conceptually, the consistency function is the as described above: it defines as the number of inputs consistent with the given location as the source of the shot. Conceptually, the miss distance defines a circle around the sensor device and the projectile trajectory is necessarily a tangent of this circle from the shooter position. The value of the consistency function is increased by the number of circles that share a tangent from the given point. The range also defines a circle around the sensor device and the shooter position is on this circle. The number of such circles the given point falls on is the contribution to the consistency function. The muzzle blast TOA is considered exactly as described in the illustrative example above. The contribution of the shockwave TOA is computed similarly to that of the muzzle blast, but the geometry is more complicated. Here it is not enough to consider a shooter position, but the shot direction. That is, the angle of the trajectory also needs to be considered. The absolute shot time can then be computed using the muzzle speed at the source and the known approximately linear deceleration function.

The contribution of the shockwave TOAs is then the number of absolute shot times that fall within a small time window, just as illustrated for muzzle blasts in FIG. 8. Note that this increases the dimension of the consistency function from two (x and y coordinates) to three by including the projectile trajectory angle.

Measurement errors and a maximum of this function can then be determined dividing the area of interest into a rectangular grid of pre-defined resolution. For example, in one embodiment a grid resolution of 5×5 m can be used, however the invention is not limited in this regard and other resolutions can be used without limitation. The third dimension of the consistency function, the trajectory angle can also be quantized. For example, multiples of 5 degrees can be used. However, the various embodiments of the invention are not limited in this regard and any other values can be used.

The value of the consistency function can then computed for each cell/direction in the following way:

Miss distance: From the center of each cell and for every trajectory angle, the number of miss distance circles is determined whose tangent is within a small angle error.

Range: The number of range circles is determined that intersect the given cell (see FIG. 9A.

Shockwave TOA: The number of consistent shockwave TOAs is determined for the center of each cell, but the time window size is increased according to the cell size.

Muzzle blast TOA: The number of consistent muzzle blast TOAs is determined for the center of each cell, but the time window size is increased according to the cell size.

An exhaustive search for the maximum consistency function value among every cell/direction can then be carried out to locate the maximum. This obviously does not scale well and may prove to be prohibitively expensive/slow on a mobile phone. However, the procedure can be optimized by performing a multi-resolution search where the resolution of the grid is iteratively refined from a very coarse level down to the expected accuracy level. Further details regarding this optimization procedure are described in U.S. Pat. No. 7,433,266 to Ledeczi et al., the contents of which is incorporated by reference in its entirety.

This optimization procedure has been previously used to perform a search on a fine resolution grid (less than 1 m) and in 3D. However, since the expected accuracy will generally be lower than possible with specialized hardware, a 2D search is sufficient. Further, even though the grid resolution will be coarser, the search space will also be much smaller. Additionally, the grid resolution can be dynamic. For example, for distant potential shooter locations, the grid resolution can be much coarser than for places close to the sensor devices.

A traditional method based on TDOA equations would fail even in this simple illustrative case, since it would include the non-LOS detection in determining the location estimate. Thus, by providing automatic filtering of erroneous detections and using only the correct detections to compute the location estimate, a trajectory and shooter location can be determined in the various embodiments of the invention.

Figure 9A:
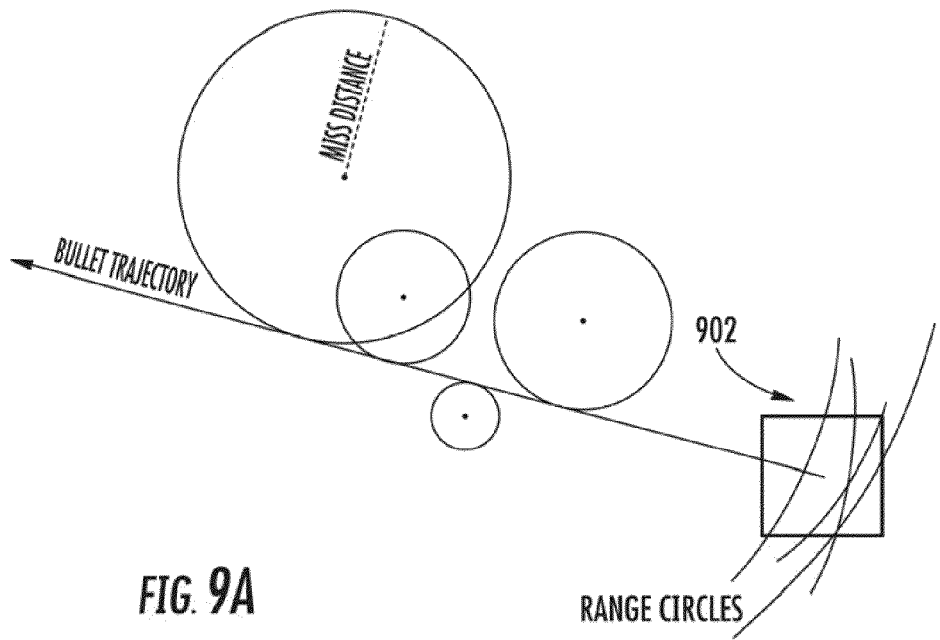
FIGS. 9A and 9B schematically illustrate methods for identification of shooter location and projectile trajectory in accordance with an embodiment of the invention.
Figure 9B:
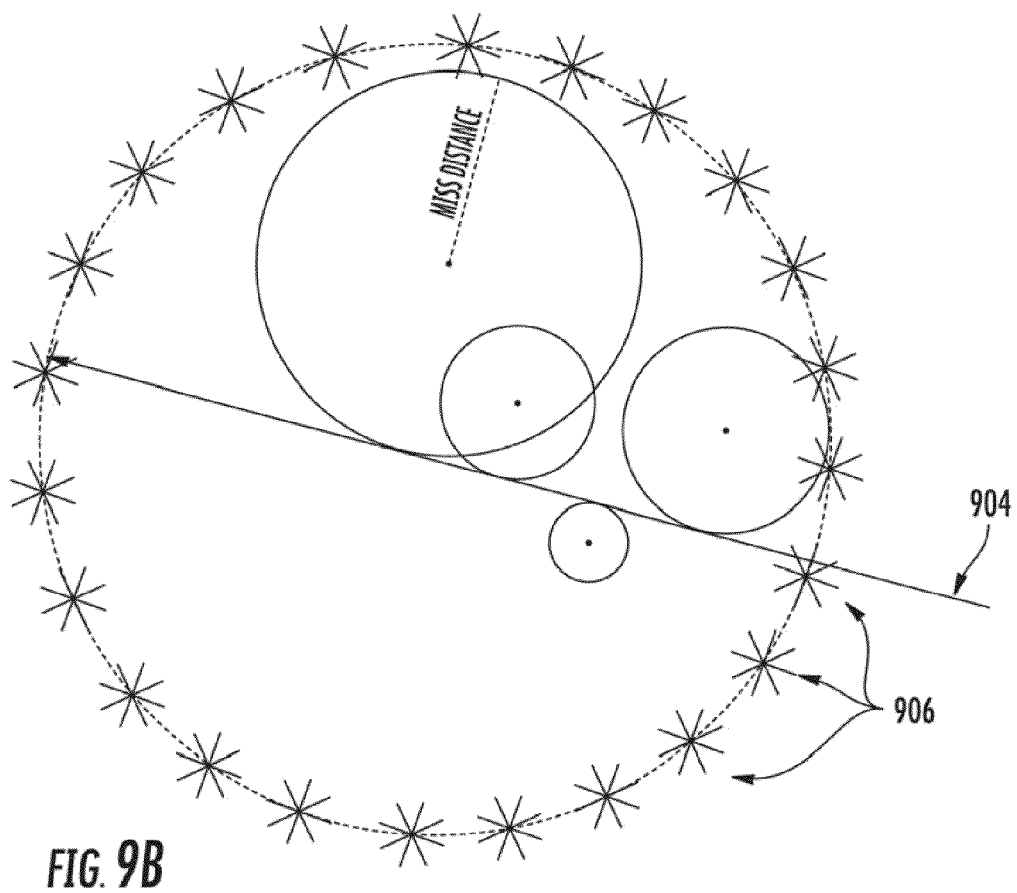

In other embodiments of the invention, less computation-intensive methods can be used. These are conceptually described with respect to FIGS. 9A and 9B. FIGS. 9A and 9B schematically illustrate methods for identification of shooter location and projectile trajectory in accordance with an embodiment of the invention. As described earlier, each of the sensor devices, prior to sensor fusion, has already detected both the muzzle blast and the shockwave provide an accurate range estimate. Therefore, as shown in FIG. 9A, the consistency function can be evaluated on a grid such that the number of reported ranges that are consistent with the particular rectangular area 1002 are counted and will give the location of the shooter. However, the networked solution can also provide trajectory, and hence, the bearing of the shooter. Thus the process in FIG. 9A can be simplified substantially. Thus once a trajectory is found, the range estimates can be used to more quickly determine the shooter position, since the search area is significantly reduced.

To find the trajectory, the miss distances and the shockwave TOAs are only considered when computing the consistency function. The search space is also much simpler: it is of 2 dimensions only. Therefore, if a circle is defined that encompasses all the small circles defined by the miss distances, as shown in FIG. 9B, the trajectory 904 would be a straight line extended to infinity in both directions and intersecting this circle. The search can then consider points on this circle equally spaced from each other. Thereafter, from each point, all possible trajectory directions can be considered (e.g., 5 degrees apart), defining the second dimension of the search space. If the circle has a diameter of 100 m, there are only about 2000 points of the space to evaluate the consistency function at. For instance, the particular point and corresponding angle that gave the best consistency value in FIG. 9B is at point 906. Thereafter, the search window for consistent ranges can be limited to those associated with the trajectory 904 and point 906. Thus, the amount of computation is significantly reduced.

Networked Operation without Weapon Information

In the various embodiments described above with respect to single sensor approaches and networked operation approaches, the various computations and estimates are derived based on the assumption that the type of weapon is know a priori. That is, it is assumed that characteristics of the projectile would be known. Although in various scenarios such information might be known, in other scenarios such information may be unavailable. Worse yet, the available information can be inaccurate, resulting in incorrect estimates and increasing the risk for personnel in the field.

All or a subset of the following parameters is available for the sensor fusion from each sensor: shockwave length, shockwave TOA and muzzle blast TOA. The sensor locations are also known and all TOAs use the same time base. Note that the individual miss distance and range estimates are not used since they are based on the AK47 assumption. The sensor fusion algorithm carries out the following steps:

Initial shooter localization. Traditional multilateration based on the muzzle blast TOAs is applied. The main goal of this step is to reduce the trajectory search space for the step. If there are not enough observations, this step is skipped.

Projectile trajectory estimation. A search is performed to find the minimum of an error function that is defined on the space of possible trajectories. It has two components. The first is the least squares error of the miss distances computed using Equation 1 and the measured shockwave lengths. The second is based on the variance of the shockwave angles computed using pairwise shockwave TDOAs. Both of these incorporate outlier rejection also. The value of the error function is the product of the two components. The result of the search is the best trajectory that matches the shockwave observations.

Final shooter localization. The side effect of the trajectory search is that a good estimate of the projectile speed is available because the angle of the shock wavefront and the trajectory provides it. The trajectory and the sensor locations provide the miss distances. Using the same approach as for single sensors, the range from each sensor can be estimated without the AK47 assumption. Basic trilateration then provides the shooter location. Since there are typically more than three sensors and the trajectory is also available, a simple optimization method is applied.

Caliber estimation and weapon classification. Since the projectile speed is known at this point, the two unknowns that remain in Equation 1 are the caliber and the bullet length. As there are only a handful of discrete choices for these, the caliber and the projectile length can be determined. Since the range to the shooter is also available from the previous step, weapon classification can be performed various techniques.

Initial Shooter Localization

As described above, the first step is computing an approximate shooter position. Finding the shooter location given the muzzle blast TOAs and assuming a known speed of sound is an instance of the classic multilateration problem. Pairwise muzzle blast TDOAs constrain the shooter location to hyperbolas (or hyperboloid surfaces in three dimensions), the intersection of which is the shooter location itself. Conventional techniques and methods for addressing the multilateration problem typically range from direct linearization to nonlinear optimization approaches. Unfortunately, such techniques perform poorly when unbounded errors may be present in the inputs. Non-line of sight conditions and echoes often result in TOAs that are not consistent with the geometric configuration of the shooter and the microphones. Also, diffraction can alter the shockwave signature to a degree such that it is classified as a muzzle blast. The corresponding erroneous TOAs manifest as large outliers, and cause the overall error distribution to be non-Gaussian, violating the assumptions that are required for traditional multilateration techniques to work correctly.

As a result, this problem mandates a multilateration approach that is robust against unbounded non-Gaussian TOA errors. In the various embodiments, a generalization of the Hough transformation is used, a well known image processing algorithm to find imperfect instances of objects (i.e. lines) using a voting procedure carried out in a parameter space.

For a given location S and for each microphone, when a shot must have been fired from S to give the measured TOA is computed. Normally, the shot times will not align for any location other than the true shooter position. Since errors are assumed to be present in the TOA measurements, the computed shot times for the true shooter location will not be identical, but will exhibit some scattering, as well as some (possibly large) outliers.

The algorithm works as follows. The search space (the area where the shooter can possibly be, based on the sensing range of the microphones) is subdivided into a rectangular grid of a predefined resolution. For each point S on the grid, the shot times that correspond to the muzzle blast TOAs supposing that the shooter is at S are computed, effectively mapping the TOA measurements to a parameter space of shot times. For a given point S, clustering of points in the parameter space indicate that a shot is likely to have been fired from S. The search algorithm, therefore, is looking for the most consistent cluster, and the corresponding grid point is returned as the shooter position estimate. In such embodiments, the grid need not be a regular grid. In fact, a finer grained grid can be provided closer to the sensor field, and the granularity can be decreased further away from the sensors.

The variance of the shot times within a cluster is then used as the metric of consistency. Intuitively, the scattering of shot times within a consistent cluster should be no more than the measurement error of the muzzle blast TOAs plus the error introduced by the discretization of the search space. A threshold for the variance of shot times above which the clusters are rejected as invalid can be empirically found. Also, the cardinality of the cluster must be at least 3 (4 in three dimensions), since this is the minimum number of TOAs required to unambiguously find a point source. Since non-Gaussian TOA errors are assumed, the minimum required cardinality of the clusters can be increased from the theoretical minimum to $N>3$. This will decrease the probability of finding false consistent clusters, thereby improving the robustness of the algorithm.

An inherent property of multilateration is that the accuracy of the result is highly dependent on the geometry. For instance, when the microphones are located in close proximity of each other, but the shooter is relatively far from the sensors, which is the most common case in this problem domain the direction estimate to the source will be accurate, but the range can exhibit relatively large errors, as discussed further below. Since the initial shooter position estimate will be used exclusively to reduce the search space for trajectory estimation, the geometric dilution of precision of multilateration does not significantly affect the estimates computed herein. Further, since it is expected that the projectile passes over the sensor field or close by (otherwise no shockwave signatures are picked up by the microphones), the direction component of the shooter position estimate provides the information needed.

Projectile Trajectory Estimation

Trajectory estimation is a search procedure in the space of possible trajectories for the minimum of an error function. The error function has two components. The first one is based on the measured shockwave lengths.

Rearranging Whithan's equation (Equation 1) provides:

$$b \approx kT^4 \qquad (12)$$

That is, the miss distance is proportional to the fourth power of the shockwave length, with a scaling factor of k. k is bounded and the bounds can be obtained by substituting the minimum and maximum parameter values (projectile speed, length and caliber, speed of sound) into Equation 1.

The error function is defined to jointly optimize the trajectory angle and k. Formally, the problem formulation fund the trajectory estimate is the following. Given a set of microphone positions $M_i$ and the corresponding shockwave length measurements $T_i$, find the trajectory L that minimizes $$\Sigma w_i(b_i - kT_i^4)^2, i=1 \ldots n \qquad (13)$$

where n is the number of microphones that reported shockwave detections, $b_i$ is the distance of $M_i$ from the trajectory, and $w_i \in \{0,1\}$ are binary weights assigned such that only the N smallest error values are considered.

While the above technique is sufficient to find the trajectory, the second component of the error function relies on the shockwave TOAs that provide additional information to refine the trajectory estimate, as well as to compute the speed of the bullet.

Assuming a given trajectory, the shockwave TDOA of a pair of microphones can be used to compute the angle of the conical shockwave front (precisely the angle of the axis and the surface of the cone). This angle $\alpha$ is related to the bullet velocity as described in Equation 6.

Figure 10:
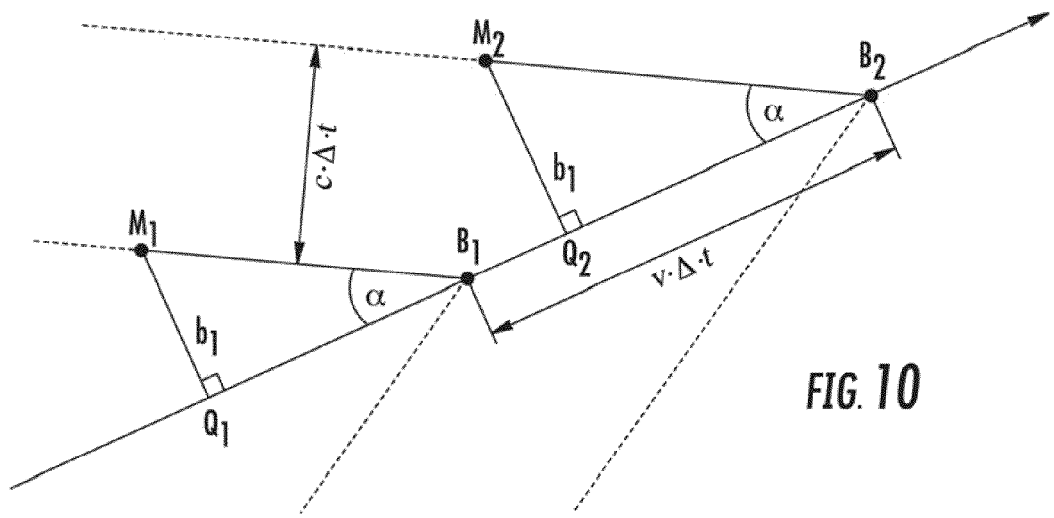
FIG. 10 is a schematic illustrating shockwave angle calculation using TDOA in accordance with an embodiment of the invention.

Consider FIG. 10. FIG. 10 is a schematic diagram illustrating computation of shockwave angle using TDOA. As shown in FIG. 10, microphones $M_1$ and $M_2$ with miss distances $b_1$ and $b_2$ detect the shockwave at times $t_{sw1}$ and $t_{sw2}$, respectively. For the sake of simplicity, assume that the TDOA, denoted by $\Delta t = t_{sw2} - t_{sw1}$, is positive (if not, the labeling of the two microphones can be changed to make $\Delta t$ positive). It is easy to see that at time $t_{sw1}$ (i.e. when the shockwave front hits microphone $M_1$) the bullet is at position $B_1$, and similarly, at $t_{sw2}$, the bullet is at point $B_2$. Therefore, the bullet, traveling at speed v, covers the $|B_1B_2|$ distance in $\Delta t$ time. With $Q_1$ and $Q_2$ denoting the orthogonal projections of the respective microphone positions to the trajectory, one can write the following equality:

$$|Q_1B_1| + v\Delta t = |Q_1Q_2| + |Q_2B_2| \qquad (14)$$

Here, $\Delta t$ and $|Q_1Q_2|$ are known, while $|Q_1B_1|$ and $|Q_2B_2|$ can be expressed with the shockwave angle and miss distances $b_1$ and $b_2$:

$$|Q_1B_1| = \frac{b_1}{\tan\alpha} \qquad (15)$$

$$|Q_2B_2| = \frac{b_2}{\tan\alpha}$$

From Equation 6, v can be expressed in terms of tan $\alpha$, as well. Substituting back to Equation 15, one gets the following equation that is quadratic in tan $\alpha$ and has a unique solution:

$$\frac{b_1}{\tan\alpha} + c\sqrt{1 + \frac{1}{\tan^2\alpha}} \Delta t = |Q_1Q_2| + \frac{b_2}{\tan\alpha} \qquad (16)$$

The shockwave angle computed this way may contain errors if the speed of sound, or the assumed trajectory are incorrect, or if the TDOA is noisy. We, however, know that the bullet speed must have been higher than the speed of sound (since there is no acoustic shockwave for subsonic projectiles), and lower than $v_{max}$, the maximum bullet speed of the weapons being considered. Therefore, the corresponding shockwave angle must be less than $\pi/2$ but higher than $\sin^{-1}(c/v_{max})$. These bounds can be used to validate the computed results and allow for discarding a subset of the outliers. The second component of the error function is then the variance of the shockwave angles computed for all pairs of microphones. The final error function is the product of these two components. Formally, it is defined for a trajectory L and a scaling factor k as $$\Sigma w_i(b_i - kT_i^4)^2 \mathrm{var}(\{\alpha_{i,j}\}), i,j=1 \ldots n \qquad (17)$$

where n is the number of microphones that reported shockwave detections, $b_i$ is the distance of $M_i$ from the trajectory, $\alpha_{i,j}$ is the shockwave angle computed from the shockwave TDOA of microphones $M_i$ and $M_j$, and $w_i \in \{0,1\}$ are binary weights assigned such that only the N smallest error values are considered.

Notice that once the best fit trajectory is found, the computed shockwave angles give the bullet velocity (see Equation 6).

The search procedure to minimize the error function is carried out as follows. If the approximate shooter position is known (this is the output of the initial shooter localization step), the space of possible trajectories are defined by a single parameter, the slope (angle) of the line that passes through the known shooter location. If an initial shooter position estimate is not available, it is not sufficient to search for just the trajectory angle, but also for a point on the trajectory, since a point and a slope are required to define a line (in two dimensions). This way, the coordinates of the point would increase the dimension of the search space by two.

Figure 11:
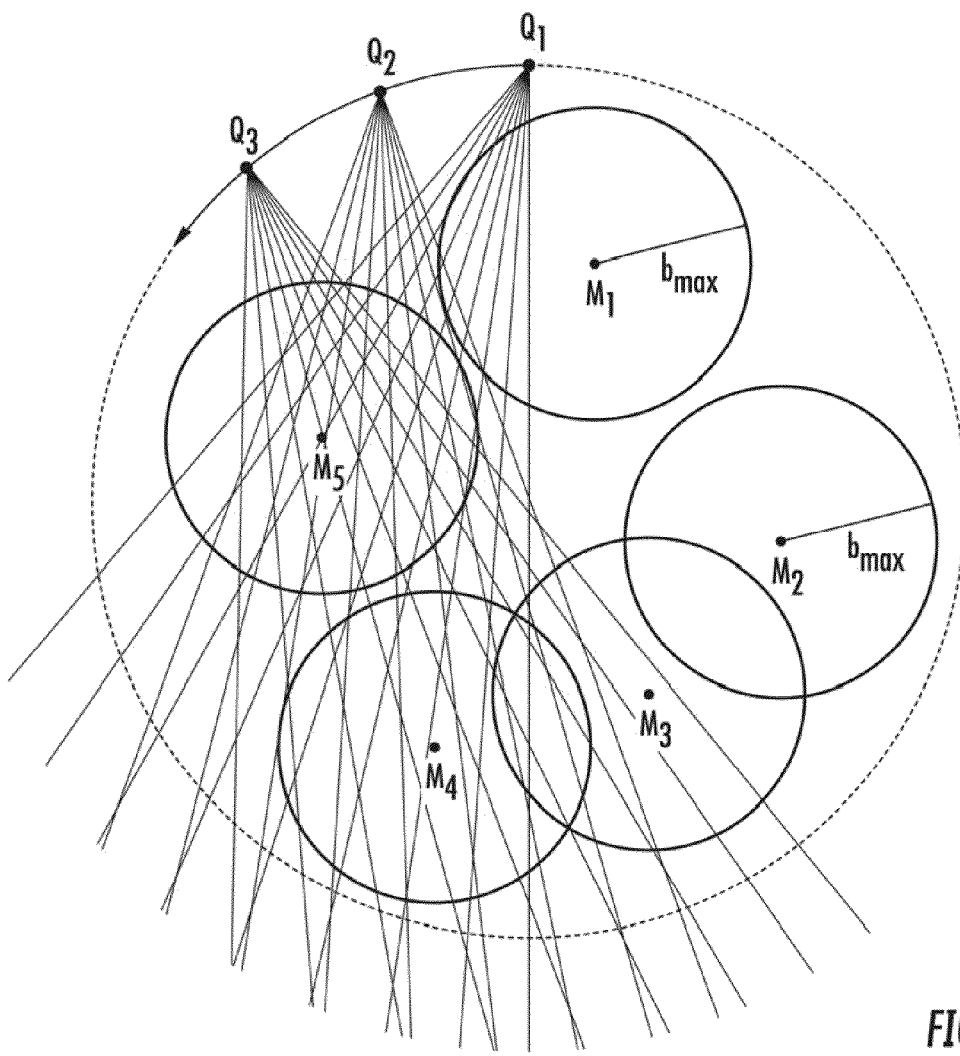
FIG. 11 is a schematic illustrating a trajectory search procedure in accordance with an embodiment of the invention.

Using the following observation, however, it is possible to express all geometrically feasible trajectories, i.e. those that either cross the sensor field, or pass close to the edge of the sensor field with just two parameters. Referring now to FIG. 11, a schematic of the trajectory search procedure is shown. The maximum shockwave sensing distance $b_{max}$ as radius is used to construct circles centered at the microphone positions. It is easy to notice that a trajectory that intersects at least N of these circles must also intersect a large circle that encompasses all small ones. (The center of the large circle can be chosen to be the center of mass of the microphone positions reporting a detection.) The geometrically feasible trajectories can be expressed by an angle variable $\phi$, running from 0 to $2\pi$ that is used to define a pivot point on the circumference of the large circle, and the slope angle. Notice that for each pivot point Pi, it is sufficient to sweep the angles right of the diameter of the large circle, since the left side will be swept from the pivot point on the other end of the diagonal.

The search for the trajectory is carried out as follows. If no shooter position estimate is available, a set of pivot points is generated on the circumference of a large circle surrounding the sensor field, constructed as described above. For all of these pivot points, half of the circle is swept with the slope angle in discrete steps, minimizing the error function given in Formula 11 for all trajectory candidates defined by the pivot points and slope angles. The trajectory candidate for which the formula gives the minimum value is returned. As a side effect k in Equation 6 and the bullet speed are also determined.

If a shooter location estimate is available, the search becomes simpler. Since one knows that the trajectory passes through the shooter position, one only needs to search for the slope angle, but not for the pivot points. The search space for the slope angle is constrained: one only has to consider those angles that define trajectory estimates which either cross the sensor field or pass close by (not further than the shockwave sensing range of the microphones). Similarly to the previous case, the search returns the trajectory candidate for which Formula 11 yielded the minimum value.

Final Shooter Localization

At this point, an approximate shooter position may or may not have been obtained, depending on whether or not the first step of the sensor fusion succeeded. However, a good trajectory estimate would be obtained in any event. The purpose of this final position refinement step is to find an accurate shooter position estimate. Here range estimates are used to carry out constrained trilateration along the trajectory, which does not suffer from the radial inaccuracy of the multilateration applied in the first step.

Once the trajectory estimate and the projectile speed are available, the shooter position estimate can be refined based on this additional information. As described above, the distance of the shooter from the microphone can be estimated if the miss distance, the bullet speed and the time difference of the shockwave and the muzzle blast are known. That is, one can compute individual microphone-shooter distance estimates using the microphones' distances from the trajectory estimate, the bullet speed estimate and the microphones' shockwave and muzzle blast detection times. At this point, these are all known without assuming a known weapon type.

Given a set of microphone-shooter distances, the shooter position can be trivially found by trilateration. But since there is a trajectory estimate available already, it is sufficient to search along the trajectory for the position that is most consistent with the range estimates. The consistency function is the mean square error of the range estimates for the position that is being evaluated. Since the range estimates may contain large outliers, one can discard all but the N range estimates that have the smallest absolute errors.

Formally, the problem formulation to find the shooter position on the trajectory estimate is the following. Given a set of microphone positions $M_i$, the corresponding range estimates $r_i$ computed using Equation 11, find the point S on the trajectory that minimizes $$\Sigma w_i (r_i - d_{S,M_i})^2, i=1\ldots n \quad (18)$$

where n is the number of microphones for which range estimates are available, $d_{S,M_i}$ is the Euclidean distance of microphone $M_i$ from the position being evaluated, and $w_i \in \{0,1\}$ are binary weights assigned such that only the N smallest absolute error values are considered.

Figure 12C:
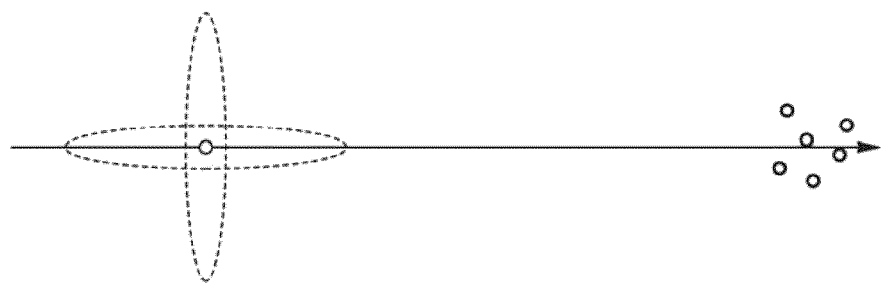
FIGS. 12A, 12B, and 12C schematically illustrate the nature of multilateration errors, trilateration errors, and error to the combination of multilateration and trilateration, respectively.
Figure 12B:
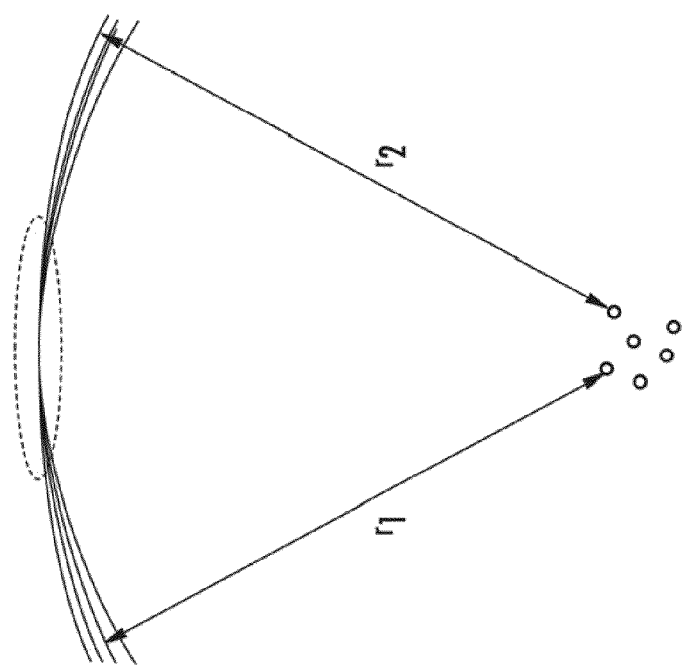
Figure 12A:
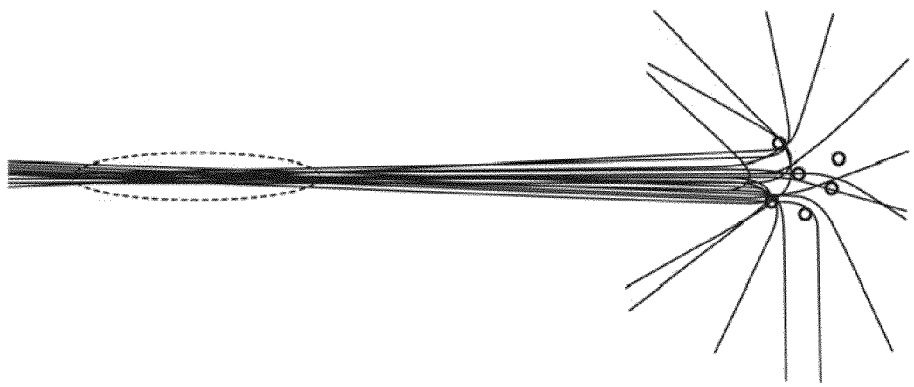

It is interesting to consider the nature of errors of multilateration vs. trilateration, if the set of sensors are relatively close to each other, while the shooter is far away. This is illustrated with respect to FIGS. 12A, 12B, and 12C. These figures illustrate the nature of multilateration errors, trilateration errors, and the result of their combination, respectively. Multilateration is based on the intersection of hyperbolas defined by pairwise TDOAs of the muzzle blast observations. Small errors can cause large displacement in the intersection of the arms at shallow angles causing a radial error pattern, as shown in FIG. 12A. Trilateration is based on the intersection of circles defined by the individual range estimates. In the same setup, the angles are shallow again, but the error pattern they create are orthogonal to the direction of the shooter as shown in FIG. 12B. Using multilateration to help find the initial shooter position estimate to cut the search space for trajectory localization and then constraining the shooter estimate to the trajectory while applying trilateration consequently minimizes the effects of the geometric dilution of precision. This is illustrated in FIG. 12C.

Caliber and Weapon Classification

The methodology described above provides two types of information available to carry out weapon classification. First, as a result of the trajectory estimation algorithm, the scaling factor k has been computed that indicates how the miss distances are related to the fourth power of the shockwave lengths. The value of k carries information about the projectile, and, together with the bullet speed, allows for projectile classification (caliber and length). Second, the bullet speed at the muzzle (also referred to as the muzzle velocity), is characteristic of the particular weapon-ammunition pair. Since an estimate of the bullet speed over the sensor field has been computed in the trajectory estimation step, the shooter position has been estimated, and the bullet-specific deceleration is known after the projectile is identified, the muzzle speed can be computed. From here, weapon classification becomes possible.

Projectile Classification

Beside the trajectory itself, the trajectory estimation step optimizes the scaling factor k that is used in the formula that relates the shockwave length T and the miss distance b. Rearranging Equation 12 which itself is derived from Whitham's formula, k can be expanded as:

$$k = \frac{lc^5}{1.82^4 d^4 v} \quad (19)$$

where l is the length and d is the caliber of the bullet, and c and v are the sound and projectile speeds, respectively. Here, the projectile specific quantity is $d^4/l$, which can be referred to as projectile coefficient $C_{projectile}$, computed as follows:

$$C_{projectile} = \frac{c^5}{1.82^4 vk} \quad (20)$$

Since the bullet speed v is also computed in the trajectory estimation step, all the information for computing the projectile coefficient is provided, which makes it feasible to differentiate between possible projectile types.

Weapon Classification

Weapon classification involves identifying the type of ammunition used and computing the muzzle speed of the projectile, as the combination of these values is often uniquely characteristic of the particular weapon used.

Calculation of the muzzle speed is carried out as follows. First, having identified the projectile as described above, its deceleration is looked up in a database (it can be computed from the ballistic coefficient (BC) typically specified by the manufacturer). Given the deceleration a (a negative number), the average projectile speed over the sensor field $v_{projectile}$ and the estimated range to the shooter position, the muzzle velocity can be approximated by:

$$v_{muzzle} = \sqrt{v_{projectile}^2 - 2ar} \quad (21)$$

Note that the above caliber estimation and weapon classification methodology is very similar to some existing techniques, this methodology can be performed without the need for multi-channel sensors. Rather, in contrast to existing techniques, the methodology above can be performed with single-channel sensors.

Evaluation

The evaluation of the methodology described above was performed using a shot library of 108 shots taken from ranges between 50 and 130 meters using six different rifles of three different calibers. They are the AK47 (7.62 mm projectile), M240 (7.62 mm), M16 (5.56 mm), M4 (5.56 mm) and M249 (5.56 mm) and M107 (12.7 mm or .50 caliber). The measurements were taken by 10 multi-channel sensors distributed in a 30×30 m area. The sensor locations were known with a few-centimeter error.

The methodology was implemented using a conventional desktop computer. When the first step of the implemented method finds an approximate shooter position, results were obtained in about 2 sec. However, when no such estimate exists, the extensive trajectory search extends this time to about 20 sec.

Figure 13:
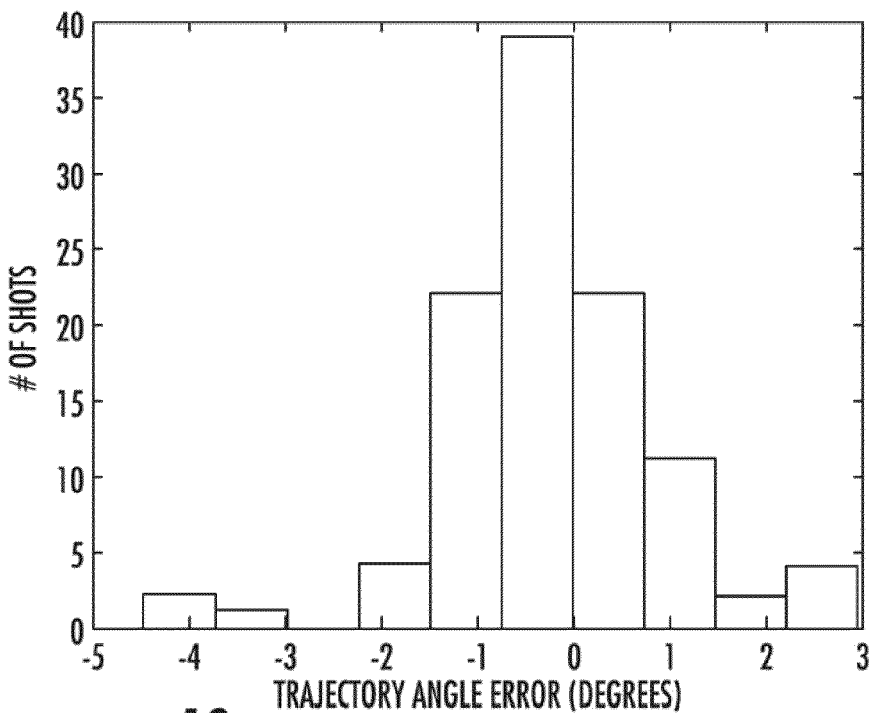
FIG. 13 is a histogram of trajectory angle errors for a sensor fusion process in accordance with an embodiment of the invention.

All 108 shots were evaluated. The cluster size for the trajectory error function was set at 5. That is, the implementation was configured for looking for five consistent sensor observations. A threshold was also set for the error function: if the minimum exceeded 4, then the observations are not consistent enough to locate the trajectory. Localization of trajectory was successful for 107 of 108 shots. The mean of the trajectory angle error, that is, the angle between the real trajectory and the estimated one, was 0.1 degree. The standard deviation was 1.3 degrees. The mean absolute error was 0.8 degree. FIG. 13 shows the histogram of trajectory angle errors.

Shooter position estimation needs a trajectory estimate and detection of at least one muzzle blast. However, if that single muzzle blast detection is erroneous, the shooter location can exhibit huge errors. Therefore, the minimum number of muzzle blast detections was set at three since two detections would not be enough to identify one of them as an outlier. Also, the threshold in the constrained trilateration procedure for the least squares error was set at 150. If this threshold was exceeded, then the muzzle blast detections are not consistent enough for shooter localization. In this case, only the trajectory is reported. Out of the 107 shots with localized trajectories, the implemented method located 104 shots.

Figure 14:
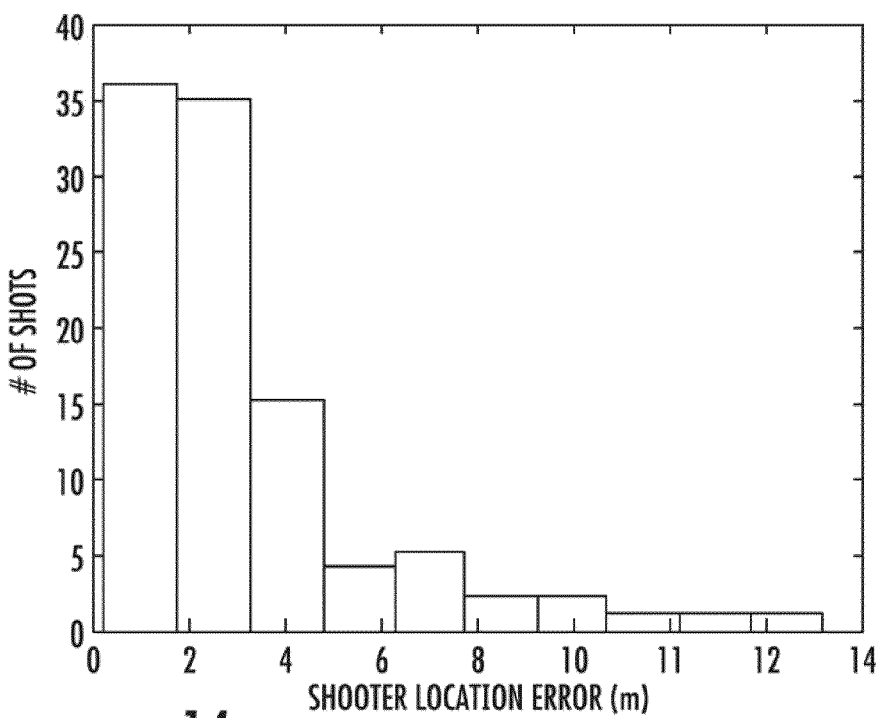
FIG. 14 is a histogram of shooter position errors for a sensor fusion process in accordance with an embodiment of the invention.

The shooter position error is measured as the distance between the ground truth and the estimated position. As such, it has only positive values. The mean position error was 2.96 m. This is better than the approximately 5.45 m mean error previously reported using multi-channel sensors with the same shots. FIG. 14 shows the histogram of shooter position errors.

Figure 15:
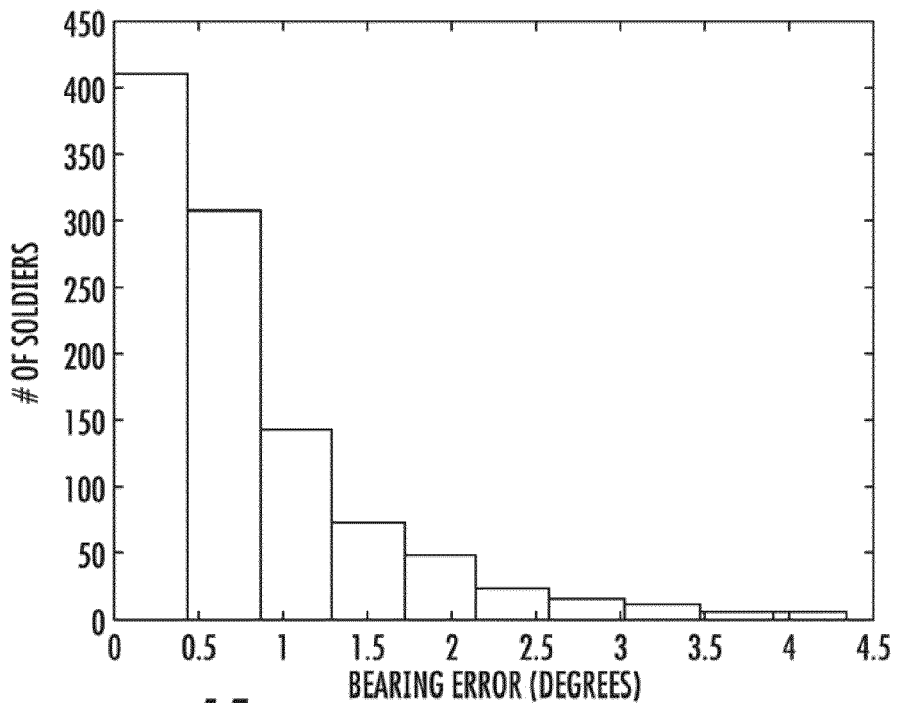
FIG. 15 is a histogram of errors in absolute bearing relative to each sensor for a sensor fusion process in accordance with an embodiment of the invention.
Figure 16:
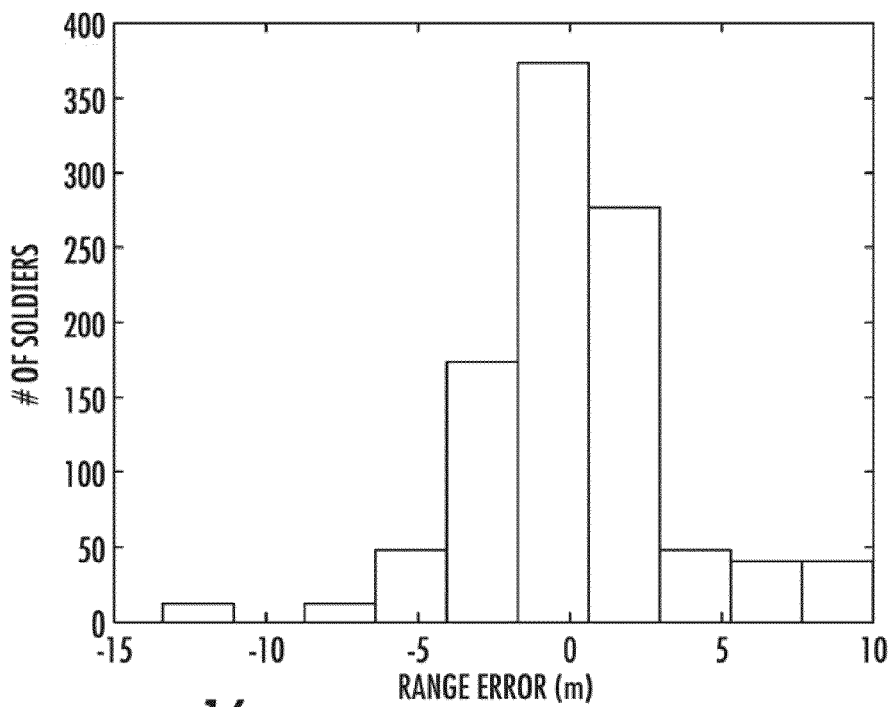
FIG. 16 is a histogram of errors in range relative to each sensor for a sensor fusion process in accordance with an embodiment of the invention.

Traditional non-networked counter sniper systems typically report their result as a bearing and range pair. For a networked system, in various embodiments, there is no such thing as bearing and range because there is no single reference point. However, the results can be reported to the individual soldier on their PDA. As such, it makes sense to translate the shooter position estimate to a bearing/range pair relative to each individual sensor's location. FIGS. 15 and 16 show the histograms of the absolute bearing error and the range error, respectively.

The mean absolute bearing error is 0.75 degrees, while the mean absolute range error is 2.3 m. These are an order of magnitude better results that those of existing commercial counter-sniper systems. The mean of the range errors is 0.2 m, while the standard deviation is 3.3 m.

Figure 17:
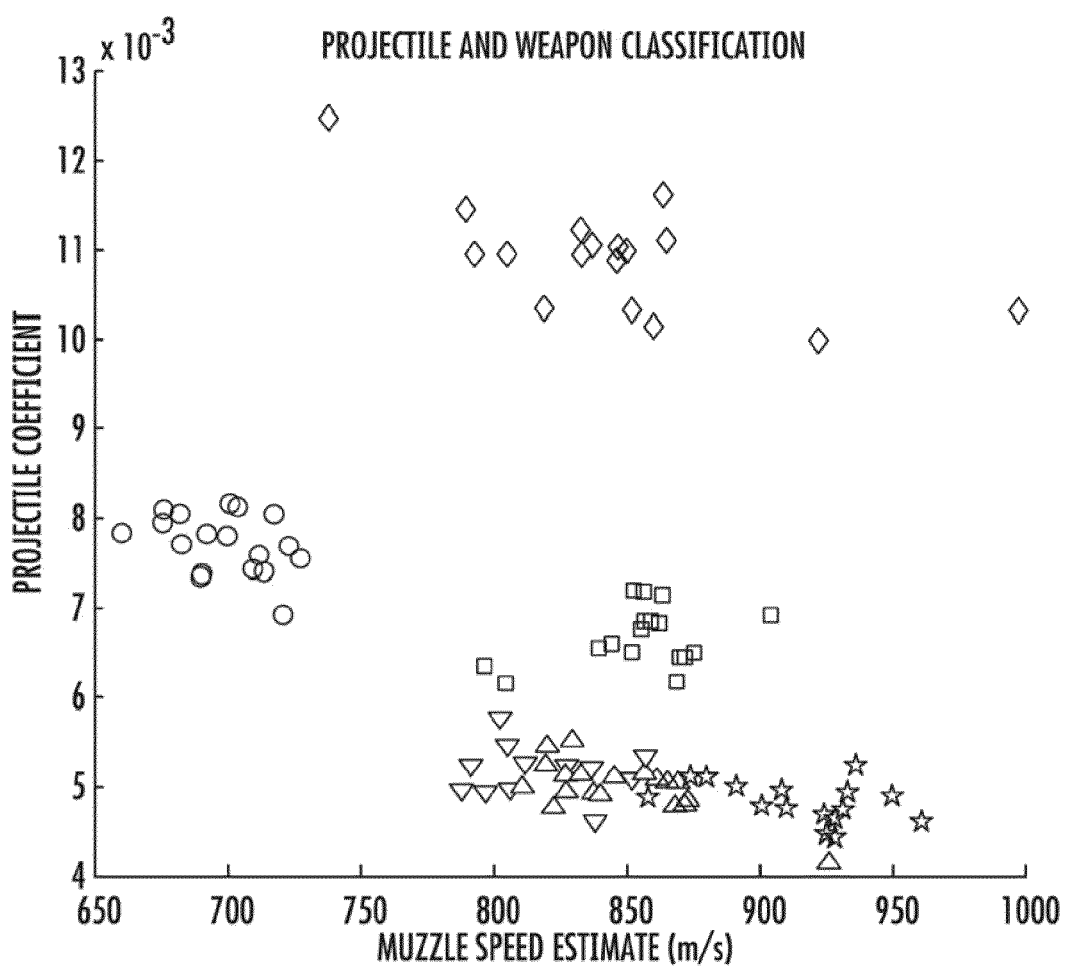
FIG. 17 is a x-y plot of muzzle speed versus projectile coefficient for a sensor fusion process in accordance with an embodiment of the invention.

FIG. 17 shows the how the 104 shots with trajectory and shooter position estimates were classified. The projectile coefficient ($C_{projectile}$) clearly separates the different caliber projectiles. The .50 caliber M107 are shown with diamonds, the 762 mm AK47 with circles, the M240 with squares, the 5.56 mm M16 with stars, M4 with triangles, and the M249 with inverted triangles. Hence, caliber estimation is 100% accurate.

Within each caliber, weapon classification works based on the estimated muzzle velocity. The AK47 and M240 are clearly separated with no overlap, hence, their classification is excellent using this data set. The M16 and M4 overlap partially; however, all but one M16 shots are classified correctly with a 875 m/s threshold. However, the M4 and M249 shots are completely intermingled making their separation difficult with the methods described herein. 5.1.

To evaluate error sensitivity to sensor position error, the same 108 shots were used with altered sensor locations. Each sensor was shifted in a random direction uniformly distributed between 0 and $2\pi$ with a uniformly distributed random displacement of a maximum amount of up to 1.5 m in 0.25 m increments. Even after such shifting, the trajectory estimation and shooter localization rates remained almost unchanged (approximately 99% and 96%, respectively). The trajectory angle and shooter position errors are shown in FIGS. 18 and 19.

Figure 18:
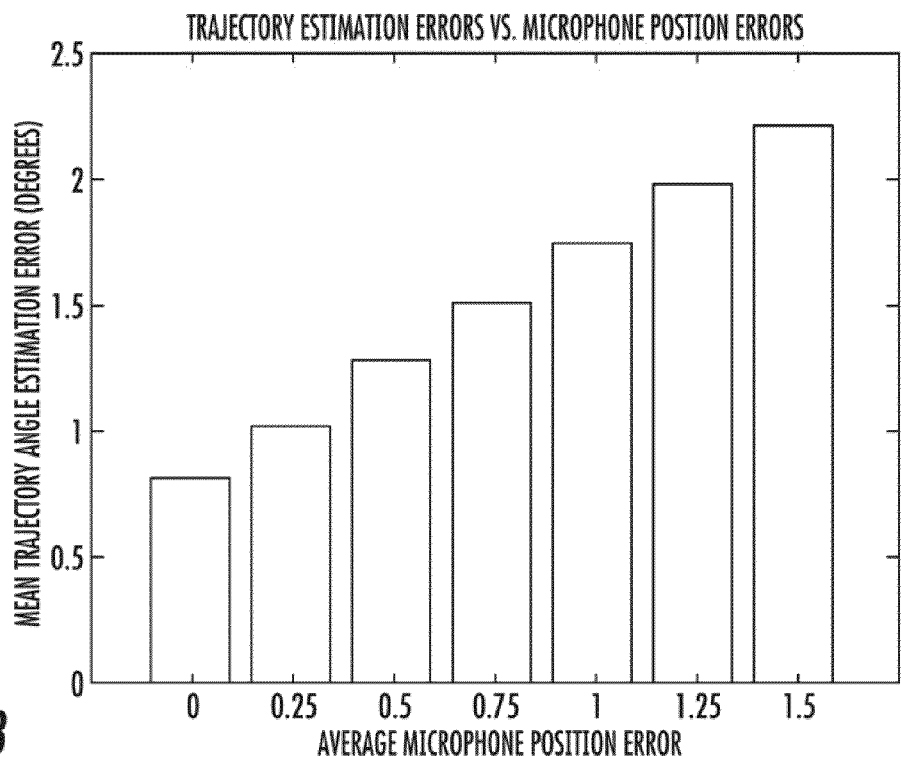
FIG. 18 is a histogram of trajectory angle error versus sensor location error for a sensor fusion process in accordance with an embodiment of the invention.
Figure 19:
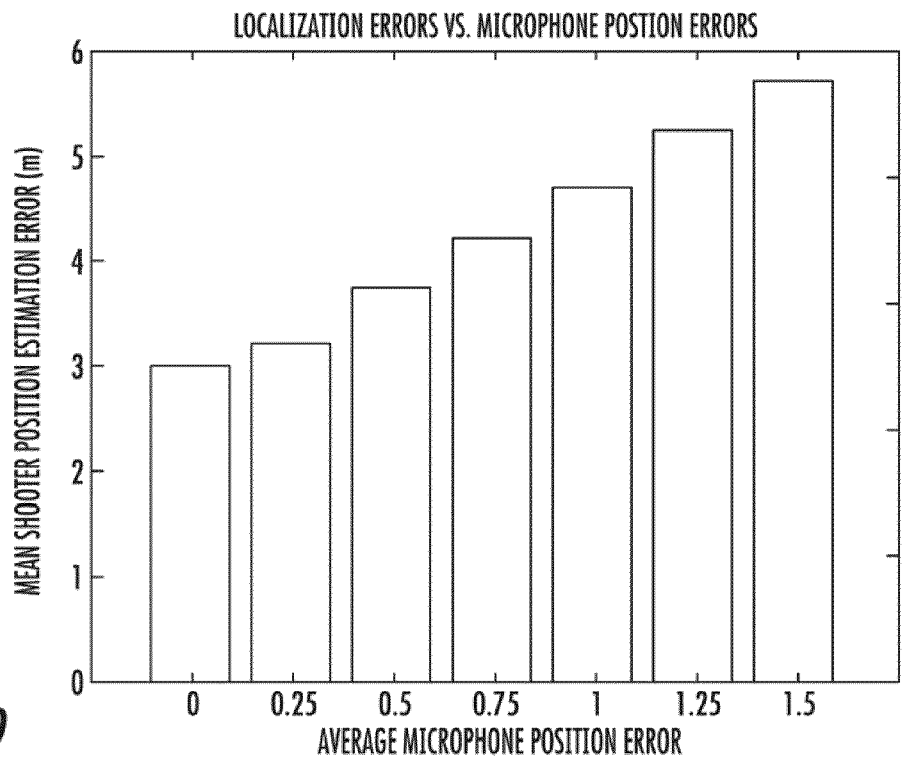
FIG. 19 is a histogram of shooter position error versus sensor location error for a sensor fusion process in accordance with an embodiment of the invention.

As shown in FIGS. 18 and 19, both the trajectory angle and the shooter position errors display an increasing trend with increasing sensor location errors, as expected. However, the worst mean angle error of 2.5 degrees and the largest average shooter position error of 5.7 m at 1.5 m sensor position errors can still be considered excellent performance.

Alternate Sensor Configurations

As described above, mechanical damping of acoustic events can be used to enhance detection of the muzzle blast and the shockwave. However, mechanical damping has its disadvantage in that it decreases the sensitivity of the microphone for other uses of the phone as well. Further, in the case of a handheld portable sensing device, such as a mobile phone, it is frequency stored in a location block the microphone, such as in a pocket. As a result, the sensitivity of the microphone may be significantly decreased, limiting the range of muzzle blast detection. Also, if the microphone rubs against a surface of an object, sounds can be generated at the microphone and can result in false detections. Therefore, in some embodiments of the invention, a separate microphone can be provided or can be incorporated into a headset.

Figure 20:
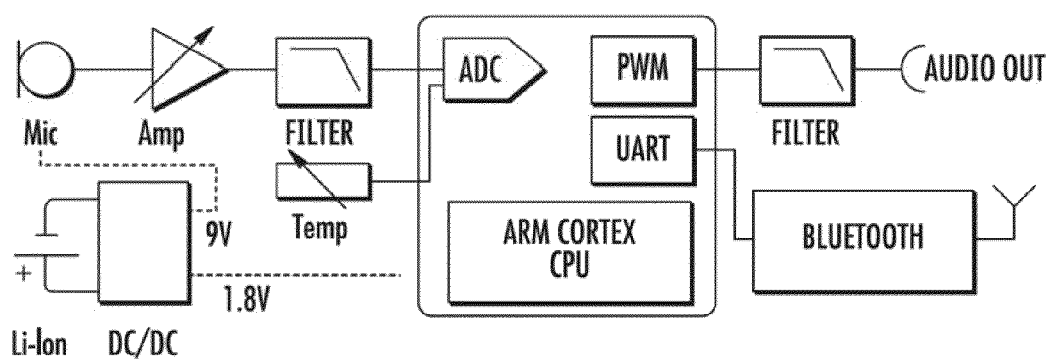
FIG. 20 is a schematic of an exemplary configuration for an external microphone and supporting circuitry.

An exemplary configuration for such an external microphone and supporting circuitry is shown in FIG. 20. In such embodiments, rather than relying on an existing microphone of a communications device, a microphone specifically designed for these type of applications will enable better dynamic range and significantly higher maximum sound pressure (shockwave impulses from close trajectories). The signal from the microphone signal can be amplified and filtered based on the properties and requirements of the transient signals. The conditioned analog signal can the than sampled with a microcontroller having an integrated A/D converter. Although the nominal bandwidth of the microphone may be limited, this does not mean that higher frequency components are completely rejected. Additionally, the microphone and microcontroller can be operated with an increased sampling rate, enabling more precise shockwave length measurements and resulting in highly accurate miss distance estimates. For example, the microcontroller can be configured to sample the signal with up to 400 ksps using 10 bits/sample. This sampling rate is more than sufficient for accurate detection and feature extraction.

Accurate estimate of the speed of sound is essential for the calculations in the proposed sensor fusion algorithm. This value—while affected by many factors, like humidity and pressure—depends mostly on the ambient temperature. Humidity can change ~10% between −15 C and 35 C. Accordingly, the external microphone can be configured include a low-power thermistor which can be periodically measured by the ADC in the microcontroller. The microcontroller can also provide real-time streaming signal processing on the single audio channel. The operational frequency—and so the power consumption—can be tuned to the state of the headset and of the detection algorithm. The microcontroller can be selected and/or designed such that our existing multi-channel FPGA-based detection algorithms can be ported to the microcontroller.

The external microphone can be configured to support two or more communication interfaces for sending detection events to the sensor device. A baseline interface can be provided that uses an analog microphone input of the sensor device. The microcontroller sends the low bandwidth detection data via this analog channel with a simple modulation technique. For example, an integrated PWM (Pulse Width Modulation) peripheral and an external low-pass filter. Demodulation can carried out in software sensor device.

Alternatively or in combination with the wired analog interface, the external microphone can also be configured to support wired communications. For example, the external microphone can be configured to support Bluetooth communications. Thus, a custom (digital) protocol can be used between the headset and the phone using a COTS Bluetooth module in the headset. This can enable higher bandwidth, low latency communication with significantly less overhead for the sensor device.

Offloading the high speed sampling and signal processing tasks from the sensor device to the external microphone can significantly reduce the complexity and resource requirements of the application running on the phone. Using a dedicated microcontroller with minimal software and peripheral overhead for continuous signal processing would also result in a significantly better overall power consumption/performance ratio. Thus, the sensor device can effectively sleep and wait for detection messages and operate only when a sensor fusion process needs to be performed.

Figure 21:
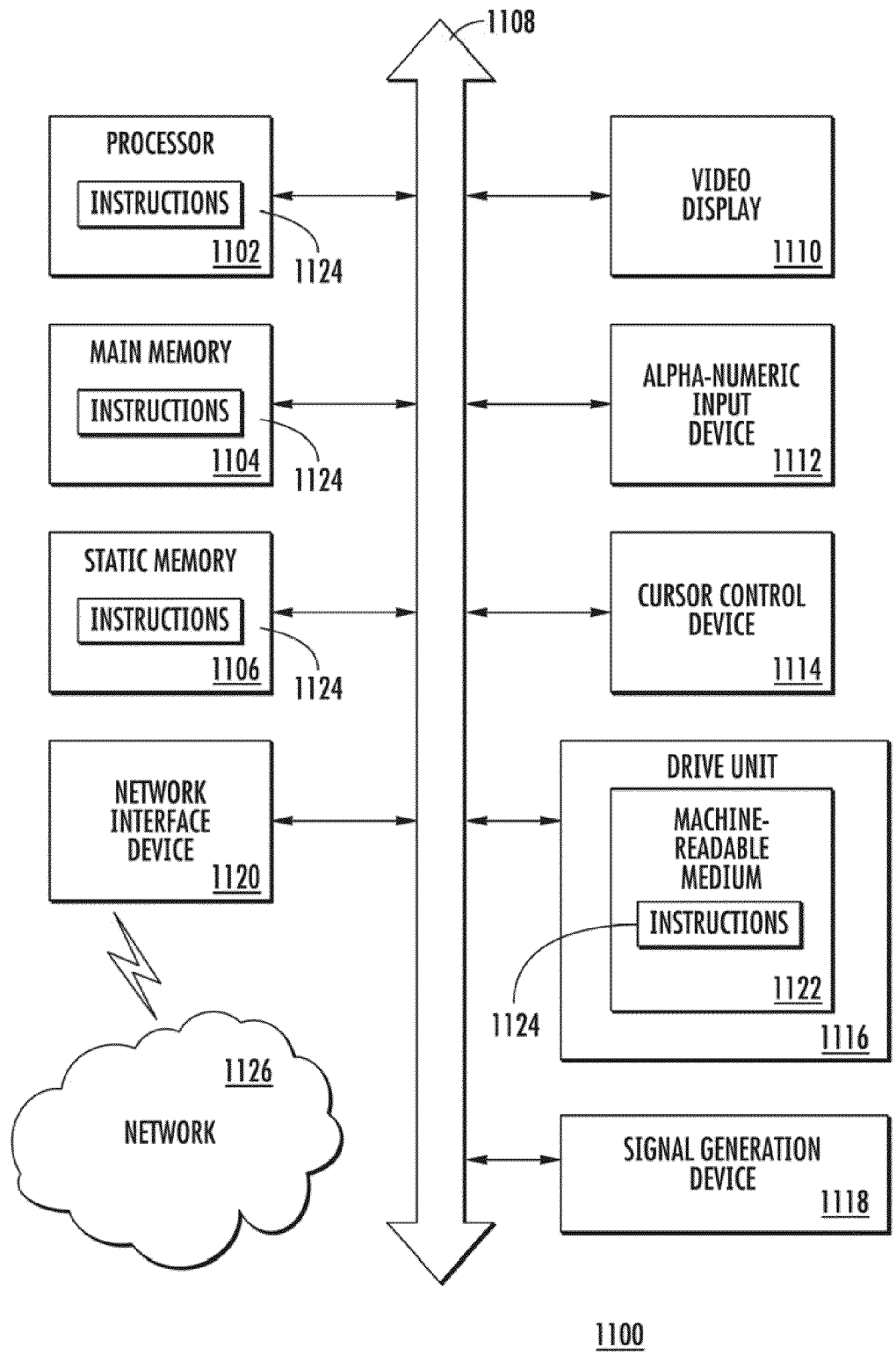
FIG. 21 is a schematic diagram of a computer system for executing a set of instructions that, when executed, can cause the computer system to perform one or more methodologies and procedures in accordance with the various embodiments of the invention.

FIG. 21 is a schematic diagram of a computer system 1100 for executing a set of instructions that, when executed, can cause the computer system to perform one or more of the methodologies and procedures described above. However, in the various embodiments of the invention, the architecture can vary and thus a device operating in accordance with one of the embodiments of the invention can include more or less components than shown in FIG. 21.

In some embodiments of the present invention, the computer system 1100 operates as a standalone device. In other embodiments of the present invention, the computer system 1100 can be connected (e.g., using a network) to other computing devices. In a networked deployment, the computer system 1100 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 1100 can include a processor 1102 (such as a central processing unit (CPU), a graphics processing unit (GPU, or both), a main memory 1104 and a static memory 1106, which communicate with each other via a bus 1108. The computer system 1100 can further include a display unit 1110, such as a video display (e.g., a liquid crystal display or LCD), a flat panel, a solid state display, or a cathode ray tube (CRT)). The computer system 1100 can include an alphanumeric input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 can include a computer-readable medium 1122 on which is stored one or more sets of instructions 1124 (e.g., software code) configured to implement one or more of the methodologies, procedures, or functions described herein. The instructions 1124 can also reside, completely or at least partially, within the main memory 1104, the static memory 1106, and/or within the processor 1102 during execution thereof by the computer system 1100. The main memory 1104 and the processor 1102 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments of the present invention broadly include a variety of electronic and computer systems. Some embodiments of the present invention implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention of the present disclosure, the methods described herein can be stored as software programs in a computer-readable medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable medium containing instructions 1124 or that receives and executes instructions 1124 from a propagated signal so that a device connected to a network environment 1126 can send or receive voice and/or video data, and that can communicate over the network 1126 using the instructions 1124. The instructions 1124 can further be transmitted or received over a network 1126 via the network interface device 1120.

While the computer-readable medium 1122 is shown in an exemplary embodiment to be a single storage medium, the term "computer-readable medium" should generally be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as devices including a tangible transmission medium for carrying carrier wave signals such as a signal embodying computer instructions; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments of the present invention with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Attached hereto is Appendix A, entitled: "SOLOMON: Shooter Localization with Mobile Phones" by Akos Ledeczi, the contents of which are herein incorporated in their entirety.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Other configurations are also possible. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for estimating location information associated with a supersonic projectile propelled from a source, the method comprising:
    recording sound at a first location using a single microphone during travel of the supersonic projectile to produce an acoustic recording; and
    estimating a miss distance (b) between the first location and a trajectory of the supersonic projectile based on a length of a shockwave generated by the supersonic projectile (shockwave length),
    wherein the estimating comprises identifying the shockwave length based on the acoustic recording and determining the miss distance based on the shockwave length and a plurality of projectile characteristics, and
    wherein the determining of the miss distance comprises performing one of:
        selecting the miss distance based on a table of predefined miss distance values as a function of a period of the shockwave based on the acoustic recording, or
        evaluating:

$$b = l\left(\frac{Tc}{dM(1.82)}\right)^4 (M^2 - 1)^{3/2}$$

where l is the projectile length, d is the projectile diameter, T is the shockwave length, c is the speed of sound, and M is the Mach number associated with the projectile.

2. The method of claim 1, wherein said recording comprises providing mechanical damping of the sound at the first location.

3. The method of claim 1, wherein said recording further comprises sampling the sound at a sampling rate of at least 48 kHz.

4. The method of claim 1, further comprising:
    calculating a time difference of arrival (TDOA) between a muzzle blast at the source and the shockwave generated by the supersonic projectile based on the acoustic recording;
    estimating a range between the first location and the source based on the miss distance and the TDOA.

5. The method of claim 4, wherein said estimating said range further comprises:
    computing an angle between the trajectory and a surface of the shockwave; and
    calculating the range based on the TDOA, the miss distance, and the angle.

6. The method of claim 5, wherein said calculating said range ($d_{S,M}$) further comprises evaluating:

$$d_{S,M} = \frac{1}{2(c^4 - v^4)}(P - 2\sqrt{Q})$$

where P and Q are defined as $$P = -2v^3 d_{Q,M} \sqrt{v^2 + c^2} - 2(t_{mb} - t_{sw})c^3 v^2 + 2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 - 2c^7 d_{Q,M}(t_{mb} - t_{sw})v\sqrt{v^2+c^2} + c^8(t_{mb} - t_{sw})^2 v^2 + 2c^8 d_{Q,M}^2 + 2v^5 d_{Q,M} \sqrt{v^2 + c^2}(t_{mb} - t_{sw})c^3,$$

and where $t_{mb} - t_{sw}$ is the TDOA, $d_{Q,M}$ is the miss distance, v is the velocity of the projectile, and c is the speed of sound.

7. A method for locating a source of a projectile, comprising:
concurrently recording sound at three or more locations during travel of the supersonic projectile to produce acoustic recordings at each of said locations;
generating a plurality of data sets associated with said locations, each of said plurality of data sets comprising a miss distance, a range, a time of arrival of a muzzle blast from said source, and a time of arrival of a shockwave produced by said projectile;
sharing said plurality of data sets among said plurality of locations; and
independently calculating an approximate location of said source at each of said locations.

8. The method of claim 7, wherein said each of said plurality of data sets further comprises time and location information.

9. The method of claim 7, wherein said recording comprises providing mechanical damping of the sound at said locations.

10. The method of claim 7, wherein said recording further comprises sampling the sound at a sampling rate of at least 48 kHz.

11. The method of claim 7, wherein said generating further comprises:
identifying a length of the shockwave (shockwave length) based on the acoustic recording;
determining the miss distance based on the shockwave length and a plurality of projectile characteristics.

12. The method of claim 11, wherein determining the miss distance (b) comprises evaluating:

$$b = l\left(\frac{Tc}{dM(1.82)}\right)^4 (M^2 - 1)^{3/2}$$

where l is the projectile length, d is the projectile diameter, T is the shockwave length, c is the speed of sound, and M is the Mach number associated with the projectile.

13. The method of claim 11, wherein determining the miss distance comprises selecting the miss distance based on a table of predefined miss distance values as a function of a period of the shockwave.

14. The method of claim 7, wherein said generating further comprises:
computing an angle between the trajectory and a surface of the shockwave; and
calculating the range based on a time difference of arrival between the muzzle blast and the shockwave (TDOA), the miss distance, and the angle.

15. The method of claim 14, wherein said calculating said range ($d_{S,M}$) further comprises evaluating:

$$d_{S,M} = \frac{1}{2(c^4 - v^4)}(P - 2\sqrt{Q})$$

where P and Q are defined as $$P = -2v^3 d_{Q,M} \sqrt{v^2 + c^2} - 2(t_{mb} - t_{sw})c^3 v^2 + 2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 - 2c^7 d_{Q,M}(t_{mb} - t_{sw})v\sqrt{v^2+c^2} + c^8(t_{mb} - t_{sw})^2 v^2 + 2c^8 d_{Q,M}^2 + 2v^5 d_{Q,M} \sqrt{v^2 + c^2}(t_{mb} - t_{sw})c^3,$$

and where $t_{mb} - t_{sw}$ is the TDOA, $d_{Q,M}$ is the miss distance, v is the velocity of the projectile, and c is the speed of sound.

16. The method of claim 7, wherein said independently calculating at each of said locations further comprises performing a sensor fusion process based on a time difference of arrival between the muzzle blast and the shockwave (TDOA), the miss distance, and the range computed for each of said locations.

17. A system for determining location information associated with a supersonic projectile, comprising at least one sensor device, the sensor device comprising:
a transducer system configured for sampling sound at a first location during travel of the supersonic projectile to produce a single channel acoustic recording of said sound;
a storage element for storing the acoustic recording; and
a processing element configured for calculating a time difference of arrival (TDOA) between a muzzle blast at the source and a shockwave generated by the supersonic projectile based on the acoustic recording, estimating a miss distance (b) between the first location and estimating a range between the first location and the source based on the miss distance and the TDOA,
wherein the processing element is configured for estimating the miss distance by identifying the shockwave length based on the acoustic recording and determining the miss distance based on the shockwave length and a plurality of projectile characteristics, and
wherein the determining of the miss distance comprises performing one of:
selecting the miss distance based on a table of predefined miss distance values as a function of a period of the shockwave based on the acoustic recording, or
evaluating:

$$b = l\left(\frac{Tc}{dM(1.82)}\right)^4 (M^4 - 1)^{3/2}.$$

where l is the projectile length, d is the projectile diameter, T is the shockwave length, c is the speed of sound, and M is the Mach number associated with the projectile.

18. The system of claim 17, wherein said transducer system comprises a microphone and a mechanical damper disposed over said microphone.

19. The system of claim 17, wherein said transducer system is configured for sampling the sound at a sampling rate of at least 48 kHz.

20. The system of claim 17, wherein said processing element is further configured for said estimating of said range by:
computing an angle between the trajectory and a surface of the shockwave; and
calculating the range based on the TDOA, the miss distance, and the angle.

21. The method of claim 17, wherein processing element is further configured for said calculating said range ($d_{S,M}$) by evaluating:

$$d_{S,M} = \frac{1}{2(c^4 - v^4)}(P - 2\sqrt{Q})$$

where P and Q are defined as $$P = -2v^3 d_{Q,M} \sqrt{v^2 + c^2} -$$
$$2(t_{mb} - t_{sw})c^3 v^2 + 2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 -$$
$$2c^7 d_{Q,M}(t_{mb} - t_{sw})v\sqrt{v^2 + c^2} + c^8(t_{mb} - t_{sw})^2 v^2 +$$
$$2c^8 d_{Q,M}^2 + 2v^5 d_{Q,M}\sqrt{v^2 + c^2}(t_{mb} - t_{sw})c^3,$$

and where $t_{mb} - t_{sw}$ is the TDOA, $d_{Q,M}$ is the miss distance, v is the velocity of the projectile, and c is the speed of sound.

22. The system of claim 17, wherein said at least one sensor device comprises three or more the sensor devices at a plurality of sensor locations, and wherein each of said sensor devices further comprises at least one transceiver, wherein said transceiver is configured for sharing a time of arrival (TOA) of the shockwave, a TOA of the muzzle blast, said miss distance, and said range among said sensor devices, and wherein said processing element is further configured for estimating a location of said source and a trajectory of said projectile based on said TOA of said shockwave, said TOA of the muzzle blast, said miss distance, and said range from said three or more sensor devices.

23. The system of claim 22, wherein the processing element is further configured for estimating said location by:
determining a consistency function for a plurality of grid locations based on said TOA of said shockwave, said TOA of the muzzle blast, said miss distance, and said range from said three or more sensor devices;
selecting a one of said plurality of grid locations associated with a maximum value for said consistency function.

24. The system of claim 23, wherein determining the consistency function comprises
generating miss distance circles and range circles for each of said plurality of sensor locations based on said miss distance and said range associated with said three or more sensors;
determining a number of miss distance circles whose tangent is within a pre-defined miss distance error angle; and
determining a number of range circles intersecting each of said plurality of grids.

25. The system of claim 24, wherein determining the consistency function further comprises:
identifying a number of said TOA of said muzzle blast range from said three or more sensor devices for each of said plurality of grids; and
identifying a number of said TOA of said shockwave from said three or more sensor devices for each of said plurality of grids.

26. A method for locating a source of a projectile, comprising:
obtaining, for a plurality of sensor locations, a length of a shockwave associated with the projectile (shockwave lengths), times of arrival for the shockwave (shockwave TOAs), and time of arrival for a muzzle blast associated with the projectile (muzzle blast TOAs);
estimating a trajectory for the projectile based at least one the plurality of sensor locations, the shockwave lengths, and the shockwave TOAs, the estimating comprising providing an error function relating miss distance to shockwave length and calculating the trajectory using a set of miss distance values for the plurality of locations that minimize the error function;
determining a final source location for the source based on the trajectory and the plurality of sensor locations.

27. The method of claim 26, wherein the error function comprises:

$$\sum w_i(b_i - kT_i^4)^2, i = 1 \ldots n,$$

where n is the number of the plurality of sensor locations, $b_i$ is the distance of $i^{th}$ one of the plurality of locations from the trajectory, and $w_i \in \{0, 1\}$ are binary weights assigned such that only the N smallest error values are considered.

28. The method of claim 26, wherein the error function comprises:

$$\sum w_i(b_i - kT_i^4)^2 \text{var}(\{\alpha_{i,j}\}), i, j = 1 \ldots n$$

where n is the number of the plurality of sensor locations, $b_i$ is the distance of $i^{th}$ one of the plurality of locations from the trajectory, $\alpha_{i,j}$ is a shockwave angle computed from a time delay of arrival (TDOA) between the muzzle blast and the shockwave between the $i^{th}$ one of the plurality of locations and a $j^{th}$ one of the plurality of locations, and $w_i \in \{0, 1\}$ are binary weights assigned such that only the N smallest error values are considered.

29. The method of claim 26, further comprising:
computing a scaling factor based on the set of miss distances that minimize the error function;
computing a velocity of the projectile based on the shockwave angle computed from time delay of arrival (TDOA) between the muzzle blast and the shockwave between a first of the plurality of locations and a second of the plurality of locations; and classifying the projectile using a projectile coefficient derived from the scaling factor and the velocity of the projectile.

30. The method of claim 29, further comprising:
computing a muzzle velocity for a source of the projectile based on the velocity of the projectile; and
classifying the weapon using the muzzle velocity.

31. The method of claim 30, wherein computing the muzzle velocity ($v_{muzzle}$) further comprises evaluating for at least one of the plurality of locations:

$$v_{muzzle} = \sqrt{v_{projectile}^2 - 2ar}$$

where $v_{projectile}$ is the velocity of the projectile, a is a deceleration factor, and r is an estimated range from the one of the plurality of locations to the source of the projectile.

32. The method of claim 26, wherein the step of determining further comprises:
providing an error function relating a Euclidean distance from a one of the plurality of sensor locations to a candidate location for the source of the projectile and a range from the one of the plurality of locations to the source of the projectile; and
calculating the final source location using the set of Euclidean distance values for the plurality of sensor location that minimize the error function.

33. The method of claim 32, wherein the error function comprises:

$$\sum w_i (r_i - d_{S,M_i})^2, i = 1 \ldots n$$

where n is the number of the plurality of locations, $r_i$ is the range from an $i^{th}$ one of the plurality of locations to the candidate location, and $d_{S,M_i}$ is the Euclidean distance for between the $i^{th}$ one of the plurality of locations and the candidate location, and $w_i \in \{0, 1)$ are binary weights assigned such that only the N smallest error values are considered.

34. The method of claim 33, wherein said calculating the range if the $i^{th}$ one of the plurality of locations further comprises evaluating:

$$r = \frac{1}{2(c^4 - v^4)} (P - 2\sqrt{Q})$$

where P and Q are defined as $$P = -2v^3 d_{Q,M} \sqrt{v^2 + c^2} -$$
$$2(t_{mb} - t_{sw})c^3 v^2 + 2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 -$$
$$2c^7 d_{Q,M}(t_{mb} - t_{sw})v \sqrt{v^2 + c^2} + c^8 (t_{mb} - t_{sw})^2 v^2 +$$
$$2c^8 d_{Q,M}^2 + 2v^5 d_{Q,M} \sqrt{v^2 + c^2} (t_{mb} - t_{sw})c^3,$$

and where $t_{mb} - t_{sw}$ is a time difference of arrival (TDOA) between the muzzle blast and the shockwave for the $i^{th}$ one of the plurality of locations, $d_{Q,M}$ is the miss distance for the $i^{th}$ one of the plurality of locations, v is the velocity of the projectile based on the shockwave angle, and c is the speed of sound.

35. The method of claim 26, further comprising:
computing an initial source location for the source based on multilateration using the muzzle blast TOAs; and
performing the step of estimating based on the initial source location.

36. A system for locating a source of a projectile, comprising:
a processor;
a first module to configure the processor to obtain, for plurality of sensor locations, a length of a shockwave associated with the projectile (shockwave lengths), times of arrival (TOAs) for the shockwave (shockwave TOAs), and TOAs for a muzzle blast associated with the projectile (muzzle blast TOAs);
a second module to configure the processor to estimate a trajectory for the projectile based at least the plurality of sensor locations, the shockwave lengths, and the shockwave TOAs;
a third module to configure the processor to determine a final source location for the source based on the trajectory and the plurality of sensor locations.

37. The system of claim 36, wherein the first module is configured for:
subdividing a search space into a plurality of points;
for each of the plurality of points, calculating shot times for the plurality of sensor locations based on the muzzle blast TOAs; and
selecting as the initial source location a one of the plurality of points associated with comparable the shot times among the plurality of sensor locations.

38. The system of claim 37, wherein the second module is configured for:
obtaining an error function relating miss distance to shockwave length; and
calculating the trajectory using a set of miss distance values for the plurality of locations that minimize the error function.

39. The system of claim 38, wherein the error function comprises:

$$\sum w_i (b_i - kT_i^4)^2, i = 1 \ldots n,$$

where n is the number of the plurality of sensor locations, $b_i$ is the distance of $i^{th}$ one of the plurality of locations from the trajectory, and $w_i \in \{0, 1)$ are binary weights assigned such that only the N smallest error values are considered.

40. The system of claim 38, wherein the error function comprises:

$$\sum w_i (b_i - kT_i^4)^2 \text{var}(\{\alpha_{i,j}\}), i, j = 1 \ldots n$$

where n is the number of the plurality of sensor locations, $b_i$ is the distance of $i^{th}$ one of the plurality of locations from the trajectory, $\alpha_{i,j}$ is a shockwave angle computed from the shockwave time delay of arrival (TDOA) between the $i^{th}$ one of the plurality of locations and a $j^{th}$ one of the plurality of locations, and $w_i \in \{0, 1\}$ are binary weights assigned such that only the N smallest error values are considered.

41. The system of claim 38, further comprising a fourth module to configure the processor to:
compute a scaling factor based on the set of miss distances that minimize the error function;
compute a velocity of the projectile based on the shockwave angle computed from a time delay of arrival (TDOA) between the muzzle blast and the shockwave between a first of the plurality of locations and a second of the plurality of locations; and
classify the projectile using a projectile coefficient derived from the scaling factor and the velocity of the projectile.

42. The system of claim 41, further comprising a fifth module to configure the processor to:
computing a muzzle velocity for a source of the projectile based on the velocity of the projectile; and
classifying the weapon using the muzzle velocity.

43. The system of claim 42, wherein the computing the muzzle velocity ($v_{muzzle}$) further comprises evaluating for at least one of the plurality of locations:

$$v_{muzzle} = \sqrt{v_{projectile}^2 - 2ar}$$

where $v_{projectile}$ is the velocity of the projectile, a is a deceleration factor, and r is an estimated range from the one of the plurality of locations to the source of the projectile.

44. The system of claim 36, wherein the step of determining further comprises:
providing an error function relating a Euclidean distance from a one of the plurality of sensor locations to a candidate location for the source of the projectile and a range from the one of the plurality of sensor locations to the source of the projectile; and
calculating the final source location using the set of Euclidean distance values for the plurality of sensor location that minimize the error function.

45. The system of claim 44, wherein the error function comprises:

$$\sum w_i (r_i - d_{S,M_i})^2, i = 1 \ldots n$$

where n is the number of the plurality of locations, $r_i$ is the range from an $i^{th}$ one of the plurality of locations to the candidate location, and $d_{S,M_i}$ is the Euclidean distance for between the $i^{th}$ one of the plurality of locations and the candidate location, and $w_i \in \{0, 1\}$ are binary weights assigned such that only the N smallest error values are considered.

46. The system of claim 45, wherein said calculating the range if the $i^{th}$ one of the plurality of locations further comprises evaluating:

$$r = \frac{1}{2(c^4 - v^4)}(P - 2\sqrt{Q})$$

where P and Q are defined as $$P = -2v^3 d_{Q,M} \sqrt{v^2 + c^2} -$$
$$2(t_{mb} - t_{sw})c^3 v^2 + 2c^2 d_{Q,M} v \sqrt{v^2 + c^2} - 2(t_{mb} - t_{sw})cv^4$$
$$Q = -2c^4 v^4 d_{Q,M}^2 + 2(t_{mb} - t_{sw})^2 c^6 v^4 + (t_{mb} - t_{sw})^2 c^4 v^6 -$$
$$2c^7 d_{Q,M}(t_{mb} - t_{sw})v \sqrt{v^2 + c^2} + c^8 (t_{mb} - t_{sw})^2 v^2 +$$
$$2c^8 d_{Q,M}^2 + 2v^5 d_{Q,M} \sqrt{v^2 + c^2} (t_{mb} - t_{sw})c^3,$$

and where $t_{mb} - t_{sw}$ is a time difference of arrival (TDOA) between the muzzle blast and the shockwave for the $i^{th}$ one of the plurality of locations, $d_{Q,M}$ is the miss distance for the $i^{th}$ one of the plurality of locations, v is the velocity of the projectile based on the shockwave angle, and c is the speed of sound.

47. The system of claim 36, further comprising:
computing an initial source location for the source based on multilateration using the muzzle blast TOAs; and
performing the step of estimating based on the initial source location.

48. A method for locating a source of a projectile, comprising:
obtaining, for a plurality of sensor locations, a length of a shockwave associated with the projectile (shockwave lengths), times of arrival for the shockwave (shockwave TOAs), and muzzle blast TOAs;
estimating a trajectory for the projectile based at least one the plurality of sensor locations, the shockwave lengths, and the shockwave TOAs;
determining a final source location for the source based on the trajectory and the plurality of sensor locations,
wherein the estimating comprises:
subdividing a search space into a plurality of points,
for each of the plurality of points, calculating shot times for the plurality of sensor locations based on the muzzle blast TOAs, and
selecting as the initial source location a one of the plurality of points associated with comparable the shot times among the plurality of sensor locations.

* * * * *